US008548842B1

(12) United States Patent
Race

(10) Patent No.: US 8,548,842 B1
(45) Date of Patent: Oct. 1, 2013

(54) SYSTEMS, METHODS AND COMPUTER PROGRAM PRODUCTS FOR ASSESSING DELIVERY AFFECTIVITY IN QUALITY FUNCTION DEPLOYMENT

(75) Inventor: John Frederick Race, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 905 days.

(21) Appl. No.: 12/349,883

(22) Filed: Jan. 7, 2009

(51) Int. Cl.
*G06Q 10/00* (2012.01)
(52) U.S. Cl.
USPC ......... 705/7.41; 705/7.25; 700/100; 700/109; 707/999.001; 715/234

(58) Field of Classification Search
None
See application file for complete search history.

(56) References Cited

U.S. PATENT DOCUMENTS

| | | | | |
|---|---|---|---|---|
| 5,732,200 A * | 3/1998 | Becker et al. | ................. | 358/1.15 |
| 5,765,137 A * | 6/1998 | Lee | ................. | 705/7.25 |
| 6,301,516 B1 * | 10/2001 | Ostrowski et al. | ............. | 700/109 |
| 6,353,767 B1 * | 3/2002 | Wakeman et al. | ............... | 700/91 |
| 6,405,344 B1 * | 6/2002 | Ali et al. | ......................... | 716/132 |
| 6,535,775 B1 * | 3/2003 | Bagepalli et al. | ............. | 700/109 |
| 6,741,951 B2 * | 5/2004 | Whaling et al. | ............... | 702/179 |
| 6,757,660 B2 * | 6/2004 | Canada et al. | ................ | 705/7.32 |
| 6,771,294 B1 * | 8/2004 | Pulli et al. | ........................ | 715/863 |
| 6,937,913 B2 * | 8/2005 | Nishikawa et al. | ........... | 700/103 |
| 8,019,554 B2 * | 9/2011 | Conway et al. | .................. | 702/19 |
| 8,121,889 B2 * | 2/2012 | Casco-Arias et al. | ....... | 705/7.41 |
| 8,473,528 B2 * | 6/2013 | Lamm, Sr. | .................... | 707/813 |
| 2002/0059093 A1 * | 5/2002 | Barton et al. | ................... | 705/10 |
| 2002/0077882 A1 * | 6/2002 | Nishikawa et al. | ............. | 705/10 |
| 2002/0107948 A1 * | 8/2002 | Ali et al. | ........................ | 709/223 |
| 2003/0125997 A1 * | 7/2003 | Stoltz | ................................ | 705/7 |
| 2003/0149499 A1 * | 8/2003 | Kirshenbaum | ................. | 700/97 |
| 2003/0163349 A1 * | 8/2003 | Ho | .................................... | 705/2 |
| 2004/0083019 A1 * | 4/2004 | Suzuki et al. | ................. | 700/110 |
| 2004/0117051 A1 * | 6/2004 | Ford | ............................. | 700/109 |
| 2004/0162752 A1 * | 8/2004 | Dean et al. | ...................... | 705/10 |
| 2004/0181446 A1 * | 9/2004 | Vance | ............................. | 705/11 |
| 2006/0136276 A1 * | 6/2006 | Schmitt | ............................. | 705/7 |
| 2006/0224325 A1 * | 10/2006 | Conway et al. | ................. | 702/19 |
| 2006/0224441 A1 * | 10/2006 | Kerkar et al. | ................... | 705/11 |
| 2009/0157453 A1 * | 6/2009 | Araki et al. | ....................... | 705/7 |

OTHER PUBLICATIONS

Matzler, Kurt and Hans H. Hinterhuber, "How to make product development projects more successful by integrating Kano's model of customer satisfaction into quality function deployment". Technovation, 18:1 (1998). pp. 25-38.*

(Continued)

*Primary Examiner* — Gurkanwaljit Singh
(74) *Attorney, Agent, or Firm* — Michael A. Springs; Moore & Van Allen, PLLC; James C. Edwards

(57) ABSTRACT

Systems, methods, and computer program products are provided for a quantifiable assessment of the delivery effectiveness of Quality Function Deployment (QFD) planning designs. In this regard, present embodiments provide quantifiable metrics that help a key stakeholder, such as a product or service provider, determine the level of success for each design requirement or Critical-To-Quality (CTQ) attribute defined in the QFD design process. Thus, based on presently described embodiments, the stakeholder can assess how well the deployment of their product or service met the original defined CTQs and/or design requirements and which CTQs and which design requirements related to those CTQs should garner further attention to ensure that the CTQ meets its objective, which in turn allows for the opportunity for the highest possible customer satisfaction with the new or redesigned product, process or service.

31 Claims, 13 Drawing Sheets

(56) References Cited

OTHER PUBLICATIONS

"The House of Quality," by J. R. Hausing et al., in Harvard Business Review, May-Jun. 1988, No. 3, pp. 63-73.*

Tuvet-Lan Tran et al., Quality Function Deployment (gfd): An Effective Technique for Requirements Acquisition and Reuse, Proc. 2nd IEEE Int'l Software Eng. Stand. Symp. (ISESS '95), pp. 191-200, IEEE, 1995.*

Miyoung Jeong, Haemoon Oh, Quality function deployment: An extended framework for service quality and customer satisfaction in the hospitality industry, International Journal of Hospitality Management, vol. 17, Issue 4, Dec. 1998, pp. 375-390.*

Hoerl, Roger W. "Six Sigma black belts: what do they need to know?." Journal of Quality Technology 33.4 (2001): 391-406.*

Taeho Park, Kwang-Jae Kim, Determination of an optimal set of design requirements using house of quality, Journal of Operations Management, vol. 16, Issue 5, Oct. 1998, pp. 569-581.*

Irem Dikmen, M. Talat Birgonul, Semiha Kiziltas, Strategic use of quality function deployment (QFD) in the construction industry, Building and Environment, vol. 40, Issue 2, Feb. 2005, pp. 245-255, ISSN 0360-1323.*

Yi Qing Yang, Shou Qing Wang, Mohammad Dulaimi, Sui Pheng Low, A fuzzy quality function deployment system for buildable design decision-makings, Automation in Construction, vol. 12, Issue 4, Jul. 2003, pp. 381-393, ISSN 0926-5805.*

Zhai, Lian-Yin, Li-Pheng Khoo, and Zhao-Wei Zhong. "A rough set enhanced fuzzy approach to quality function deployment." The International Journal of Advanced Manufacturing Technology 37.5-6 (2008): 613-624.*

Kumar, Ashok, Jiju Antony, and Tej S. Dhakar. "Integrating quality function deployment and benchmarking to achieve greater profitability."*

Vijay R. Kannan, Keah Choon Tan, Just in time, total quality management, and supply chain management: understanding their linkages and impact on business performance, Omega, vol. 33, Issue 2, Apr. 2005, pp. 153-162, ISSN 0305-0483.*

\* cited by examiner

SYSTEMS, METHODS AND COMPUTER PROGRAM PRODUCTS FOR ASSESSING DELIVERY AFFECTIVITY IN QUALITY FUNCTION DEPLOYMENT

FIELD

In general, embodiments herein disclosed relate to systems, methods, and computer program products for assessing the delivery affectivity in Quality Function Deployment (QFD) product or service planning and, more specifically, scoring the delivery affectivity of each Critical-To-Quality (CTQ) attribute and design requirement parameters defined in QFD planning.

BACKGROUND

All facets of business have come to realize that quality must be designed into a product or service, not inspected into it after design. Thus, quality can be defined as meeting the customer's needs and providing superior value. This focus on satisfying customer needs places an emphasis on techniques such as Quality Function Deployment, commonly referred to as QFD, to assist in understanding the customer needs and planning a product or service that provides for superior value.

QFD is a method used to identify critical customer requirements, commonly referred to as Critical-To-Quality (CTQ) attributes and to create a link between the CTQ attributes and design requirement parameters. QFD uses a series of matrices to document information collected, such as CTQ attributes and information developed, such as design requirement parameters and to represent the product or service provider's plan for designing the product or service.

Specifically, QFD employs the following general steps. Top-level product/service design requirements or technical characteristics are derived from customer needs, i.e., CTQs. Based on the top-level design requirements, product/service concepts are developed to satisfy these requirements and evaluated for the purpose of selecting the most optimum product/service concepts. Once optimum product/service concepts are selected, the product/service is divided into sub-categories that identify sub-product/sub-service assemblies, processes or the like. In this regard, the top-level design requirements are flowed down to these sub-product/sub-service assemblies, processes or the like. Lower-level product/service requirements and specifications, such as assembly, process or component characteristics are derived from the sub-product/sub-service assemblies, or processes. For critical assemblies, processes or components, further flow down of the lower-level product requirements and specifications may be needed. Once the lower-level product/service requirements are defined, manufacturing or implementation process steps are determined to meet the lower-level product/service requirements. Based on the manufacturing or implementation process steps, set-up requirements, process controls and/or quality controls are determined to assure a successful execution of the product/service.

QFD, by its very structure and planning approach, requires an initial time investment in the development process to assure that the product or service provider understands and agrees with what needs to be done before initiating design functions. As a result, less time should be spent deciding on designs or in redesign based on the product not being on target.

However, the current QFD approach does not provide for quantifiably assessing the overall design process after the process has been completed and the product, service or the like has been designed. Moreover, the current QFD approach does not provide for determining which initially identified CTQs were delivered as intended and which may require further attention prior to release of the product/service.

Therefore, a need exists to develop systems, methods, computer program products and the like for quantifiably assessing the affectivity of QFD planning. In this regard, the desired systems, methods, computer program products and the like should provide the product/service providers the ability to determine how well their new product/service design delivers against their original CTQs. As a result, the product/service providers can determine which CTQs require additional attention and, moreover, which high-level and/or low-level design requirements associated with the CTQs require additional attention. Such systems, methods, computer program products and the like would provide process/service stakeholders the ability to determine the quality delivered through the CTQs and design requirements and to identify which specific items require further analysis prior to product/service release or may require further analysis after product/service release.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, devices, systems and computer program products are described herein that provide for a quantifiable assessment of the delivery effectiveness of Quality Function Deployment (QFD) planning designs. In this regard, present embodiments provide quantifiable metrics that help a key stakeholder, such as a product or service provider, determine the level of success for each design requirement or Critical-To-Quality (CTQ) attribute defined in the QFD design process. Thus, based on presently described embodiments, the stakeholder can assess how well the deployment of their product or service met the original defined CTQs and/or design requirements and which CTQs and which design requirements related to those CTQs should garner further attention to ensure that the CTQ meets its objective. In accordance with presently described embodiments, traceability in terms of quantifiable metrics is provided back to the highest detail level within a QFD design, such as a CTQ level, through each intermediary detail level from the final list of low detail level design requirements. As such, the user of the present embodiments can follow the linkage from the high detail level CTQs to the lowest detail level design requirements and make adjustments as necessary to further improve the quality of the product or service.

According to one embodiment of the present invention, a method is defined for assessing the effective delivery of Quality Function Deployment design planning. The method includes associating a plurality of first level, typically the lowest level, QFD requirements with one or more second level QFD requirements, receiving an implementation grade for a plurality of first level QFD requirements and determining an implementation score for one or more second level QFD requirements. The determination is based on the implementation scores that are associated with the one or more second level QFD requirements. The method additionally includes storing the implementation scores in memory.

According to an alternate embodiment of the method, receiving the implementation grade may further include receiving the implementation grade for a plurality, and in some embodiments all, of the lowest detail level QFD requirements. In such embodiments, determining the implementation score may further include determining the implementation score for one or more, and in some embodiments all, of the QFD requirements above the lowest detail level. Thus, in certain embodiments, determining an implementation score for each of the QFD requirements above the lowest detail level further defines each of the QFD requirements above the lowest detail level as at least one of QFD design requirements, QFD functional requirements or Critical-To-Quality (CTQ) attributes.

Additionally, an optional embodiment of the method defines the implementation grade as an indicator of how effective the first level QFD design requirement has been implemented. In one embodiment, the implementation grade may be a numeric implementation grade that is based on a predetermined numeric grading scale. In another embodiment, the implementation grade may be a categorized implementation grade that is based on a perceived effectiveness of the first level QFD design requirement. In such aspects, the method may include converting the categorized implementation grade to a numeric implementation grade prior to determining the implementation score for the one or more second level QFD requirements.

In one alternate embodiment of the method, determining the implementation score may further include determining a Critical-To-Quality (CTQ) implementation score for one or more CTQ attributes. In such embodiments, the CTQ implementation score determination is based on the implementation scores of first level QFD requirements that are associated with one or more CTQ attributes.

In another alternate embodiment of the method, associating may further comprise associating the plurality of first level QFD requirements with the one or more second level QFD requirements based on QFD relationship matrix scoring values.

In further embodiments of the method, the determination of the implementation score is conducted by averaging the implementation grade of each first level QFD design requirement associated with a second level QFD design requirement to determine the implementation score of the second level QFD design requirement. In addition to averaging the implementation grades, the method may further include weighting the implementation grades of each first level QFD design requirement prior to averaging. In such embodiments, the weighting may account for an importance factor as determined by the QFD design process. In still further alternate embodiments, the determination of the implementation score may be conducted by averaging the implementation grade of lowest detail level QFD requirements associated with a first-higher or next-higher detail level QFD design requirement to determine the implementation score of the first-higher/next-higher detail level QFD design requirement. This process can occur iteratively until all of the design requirements and CTQ attributes in all of the detail levels have been scored.

In yet another alternate embodiment, the method may include comparing the implementation score to predefined score thresholds. In such aspects, the method may further entail identifying an implementation success category for second level QFD requirements based on the comparison of the implementation scores to the predefined thresholds.

Another embodiment of the present invention is provided for by a device for assessing the effective delivery of Quality Function Deployment (QFD) design planning. The device includes a computing platform having at least one processor and a memory in communication with the processor. The device also includes a QFD implementation scoring module stored in the memory and in communication with the processor. The QFD implementation scoring module is operable to associate a plurality of first level QFD requirements with one or more second level QFD requirements, receive an implementation grade for a plurality of first QFD requirements, determine an implementation score for one or more second QFD requirements based on the implementation grades of first level QFD requirements that are associated with the one or more second level QFD design requirements and store the implementation scores in the memory.

In one embodiment of the device, the QFD implementation scoring module is further operable to receive the implementation grade for a plurality, and in some embodiments all, of lowest detail level QFD requirements. In such embodiments, the QFD implementation scoring module may be further operable to determine the implementation score for one or more, and in some embodiments all, of the QFD requirements above the lowest detail level. In such embodiments, the QFD requirements above the lowest-level may include QFD design requirements, QFD functional requirements and Critical-To-Quality (CTQ) attributes.

In other alternate embodiments of the device, the QFD implementation scoring module may be further operable to associate the plurality of first level QFD requirements with the one or more second level QFD requirements based on QFD relationship matrix scoring values.

According to alternate embodiments of the device, the QFD implementation scoring module may further define the implementation grade as an indicator of how effective a first QFD design requirement has been implemented. In other optional embodiments of the device, the QFD implementation scoring module is further operable to receive a numeric implementation grade based on a predetermined numeric grading scale. Alternatively, in other embodiments, the QFD implementation scoring module is further operable to receive a categorized implementation grade based on a perceived effectiveness of the first QFD design requirement. In such aspects, the QFD implementation scoring module may be further operable to convert the categorized implementation grade to a numeric implementation grade prior to determining the implementation score for the one or more second QFD requirements.

In still further embodiments of the device, the QFD implementation scoring module may be further operable to determine a Critical-To-Quality (CTQ) implementation score for one or more CTQ attributes. In such embodiments, the CTQ implementation score determination is based on the implementation grades of first level QFD requirements that are associated with the one or more CTQ attributes.

Additionally, in other embodiments of the device, the QFD implementation scoring module may be further operable to average the implementation grade of each first QFD design requirement associated with a second QFD design requirement to determine the implementation score of the second QFD design requirement. In such aspects, the QFD implementation scoring module may further be operable to weight the implementation grades of each first level QFD requirement prior to averaging the scores to account for an importance factor. As such, the QFD implementation scoring module may be further operable to average the implementation grade of lowest detail level QFD requirements associated with a first-higher or next-higher detail level QFD design requirement to determine the implementation score of the first-higher/next-higher detail level QFD design requirement. This process can occur iteratively until all of the design requirements and CTQ attributes in all of the detail levels have been scored.

In yet another alternate embodiment of the device, the QFD implementation scoring module may be operable to compare the implementation score to predefined score thresholds. In such embodiments, the QFD implementation score module may be further operable to identify an implementation success category for the second level QFD requirements based on the comparison of the implementation scores to the score thresholds.

Yet another embodiment of the invention is defined by a computer program product. The computer program product includes a computer-readable medium. The medium includes a first set of codes for causing a computer to associate a plurality of first level QFD requirements with one or more second level QFD design requirements and a second set of codes for causing the computer to receive an implementation grade for a plurality of first QFD requirements. The medium additionally includes a third set of codes for causing the computer to determine an implementation score for one or more second QFD requirements. The determination is based on the implementation grades of the first level QFD requirements that are associated with the one or more second level QFD requirements. Additionally, the medium includes a fourth set of codes for causing the computer to store the implementation scores in memory.

In one embodiment of the computer program product, the second set of codes may cause the computer to receive the implementation grade for a plurality, and in some embodiments all, of the lowest detail level QFD requirements. In such embodiments, the third set of codes may cause the computer to determine the implementation score for one or more QFD requirements above the lowest detail level. The determination is based on the implementation grades of the lowest detail level QFD design requirements that are associated with the one or more QFD design requirements above the lowest detail level. In such aspects, the one or more QFD requirements above the lowest detail level may include at least one QFD design requirements, QFD functional requirements or Critical-To-Quality (CTQ) attributes.

In certain alternate embodiments of the computer program product the first set of codes may further cause the computer to associate the plurality of first level QFD requirements with one or more second level QFD requirements based on QFD relationship matrix scoring values.

In other optional embodiments of the computer program product, the second set of codes for causing the computer to receive the implementation grade defined as an indicator of how effective a first QFD design requirement has been implemented. Further embodiments of the computer program product may provide for the second set of codes to cause the computer to receive a numeric implementation grade that is based on a predetermined numeric grading scale. In other embodiments, the second set of codes may cause the computer to receive a categorized implementation grade that is based on a perceived effectiveness of the first level QFD requirement. In such embodiments, the second set of codes may further cause the computer to convert the categorized implementation grade to a numeric implementation score prior to determining the implementation score for the one or more second QFD requirements.

In one alternate embodiment of the computer program product, the third set of codes may be configured to cause the computer to determine a Critical-To-Quality (CTQ) implementation score for one or more CTQ attributes. The CTQ implementation score determination is based on the implementation grade of the first level QFD requirements that are associated with the one or more CTQ attributes.

In further embodiments of the computer program product, the third set of codes may cause the computer to average the implementation grade of each first level QFD requirement associated with a second level QFD requirement to determine the implementation score of the second level QFD requirement. In such embodiments, the third set of codes may cause the computer to weight the implementation grades prior to averaging. Likewise, in still further embodiments, the third set of codes may cause the computer to average the implementation grade of lowest detail level QFD requirements associated with a first-higher or next-higher detail level QFD design requirement to determine the implementation score of the first-higher/next-higher detail level QFD design requirement. This process can occur iteratively until all of the design requirements, functional requirements and CTQ attributes in all of the detail levels have been scored.

In yet another embodiment, the computer program product may include a fifth set of codes for causing the computer to compare the implementation scores to predefined score thresholds. In such embodiments, the fifth set of codes may further cause the computer to identify an implementation success category for second level QFD requirements based on the comparison of the implementation scores to the predefined score thresholds.

Thus, present embodiments herein disclosed provide for a quantifiable assessment of the delivery effectiveness of Quality Function Deployment (QFD) planning designs. In this regard, present embodiments provide quantifiable metrics that help a key stakeholder, such as a product or service provider, determine the level of success for each design requirement or Critical-To-Quality (CTQ) attribute defined in the QFD design process. Thus, based on presently described embodiments, the stakeholder can assess how well the deployment of their product or service met the original defined CTQs and/or design requirements, and which CTQs and which design requirements related to those CTQs should garner further attention to ensure that the CTQ meets its objective.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
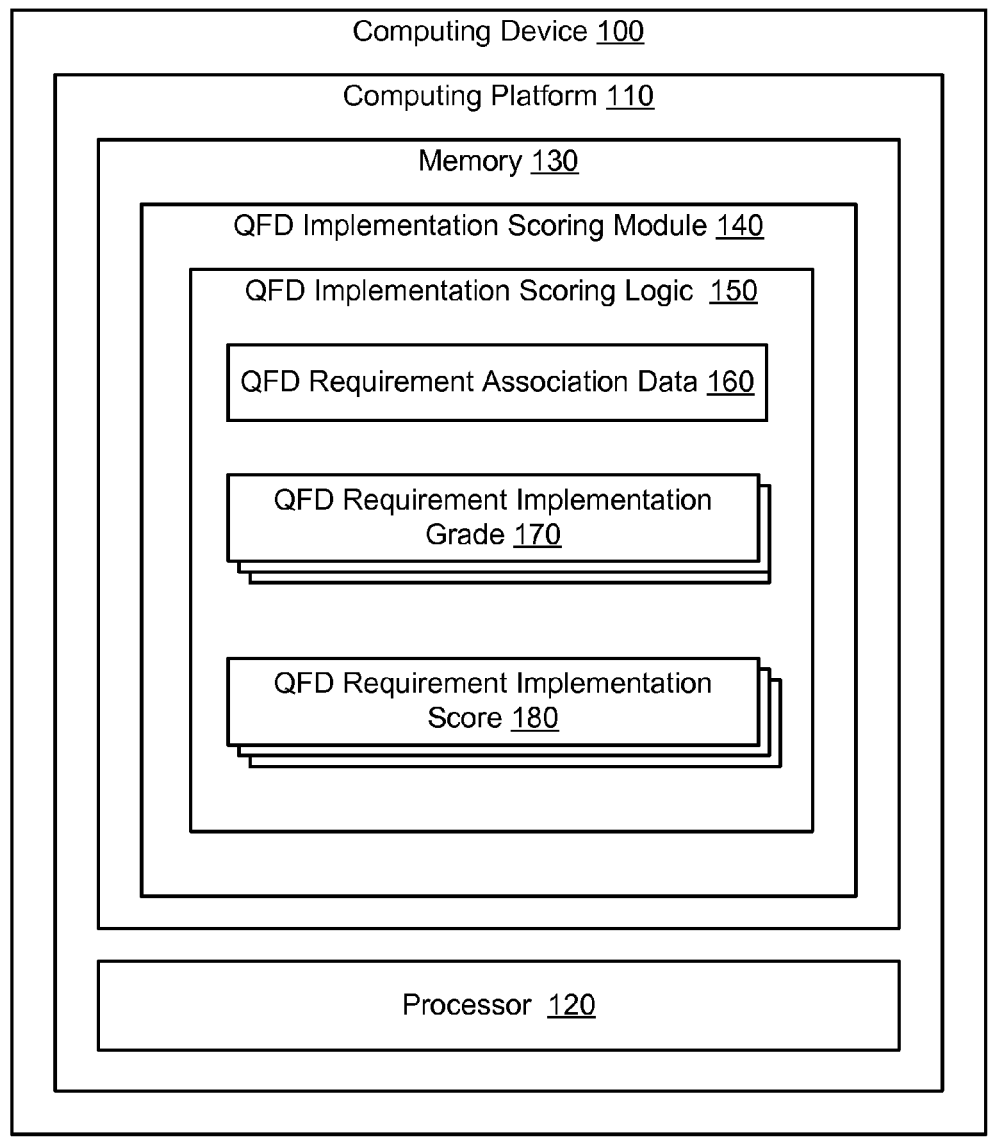
Figure 2:
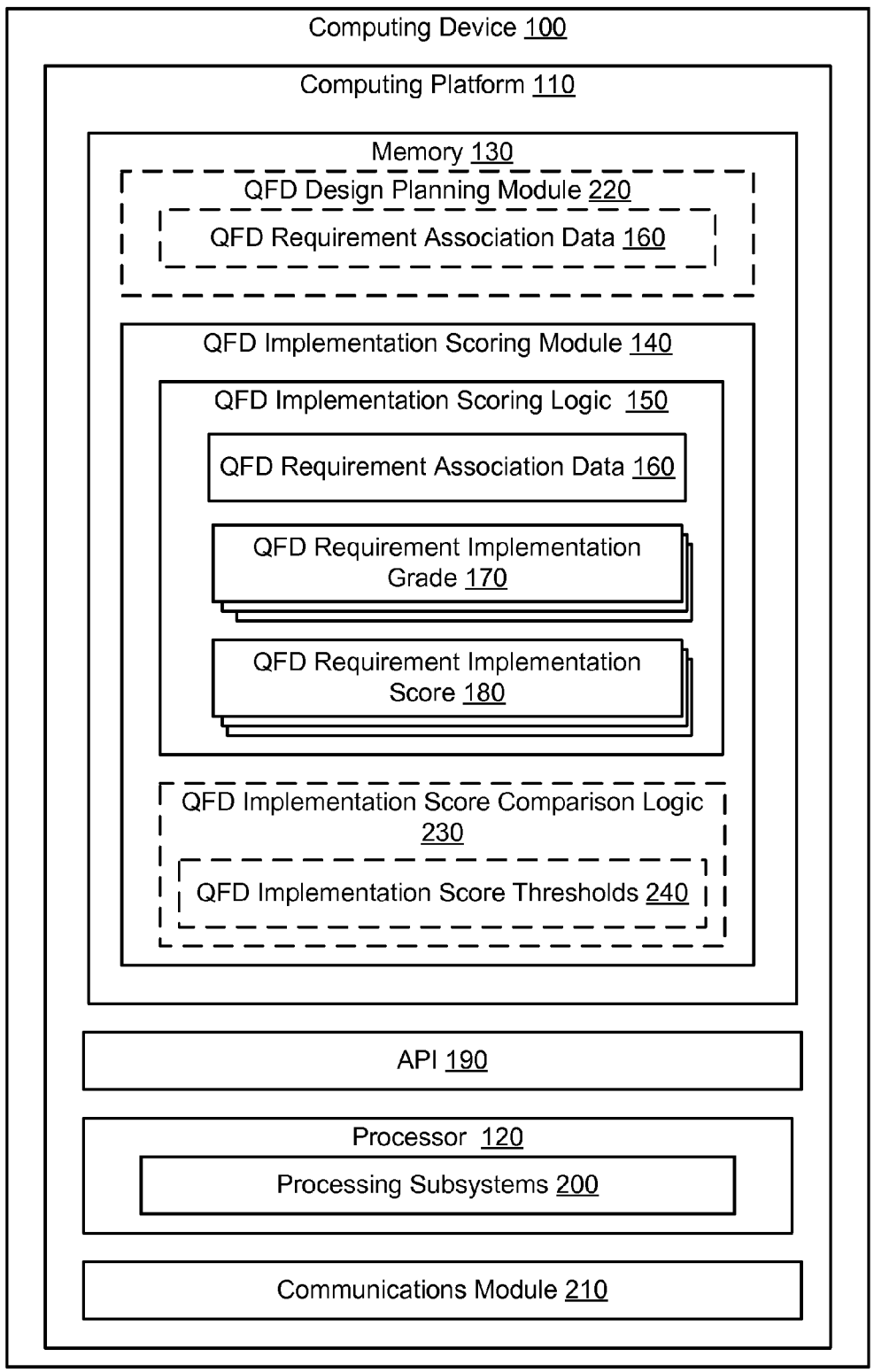
Figure 3:
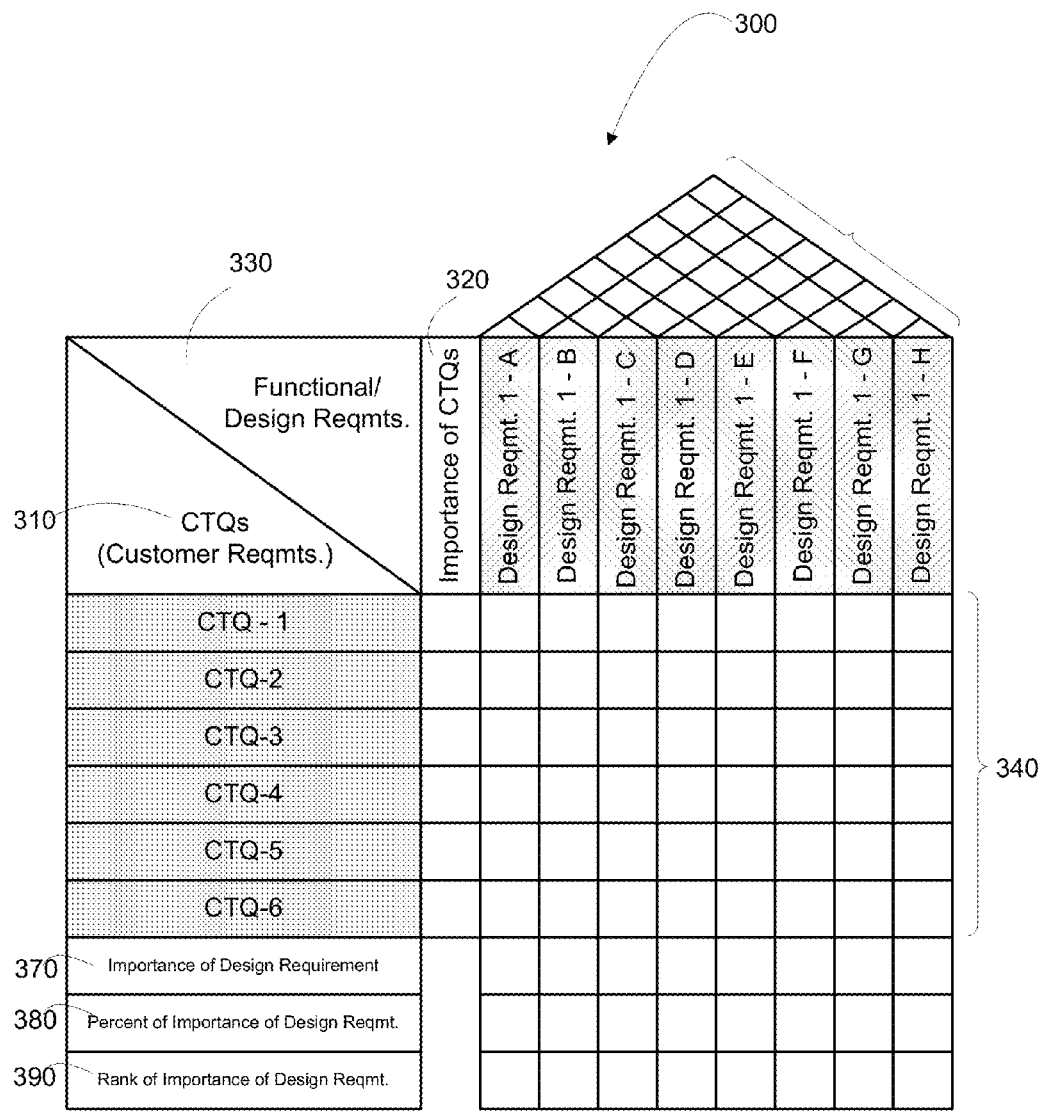
Figure 4:
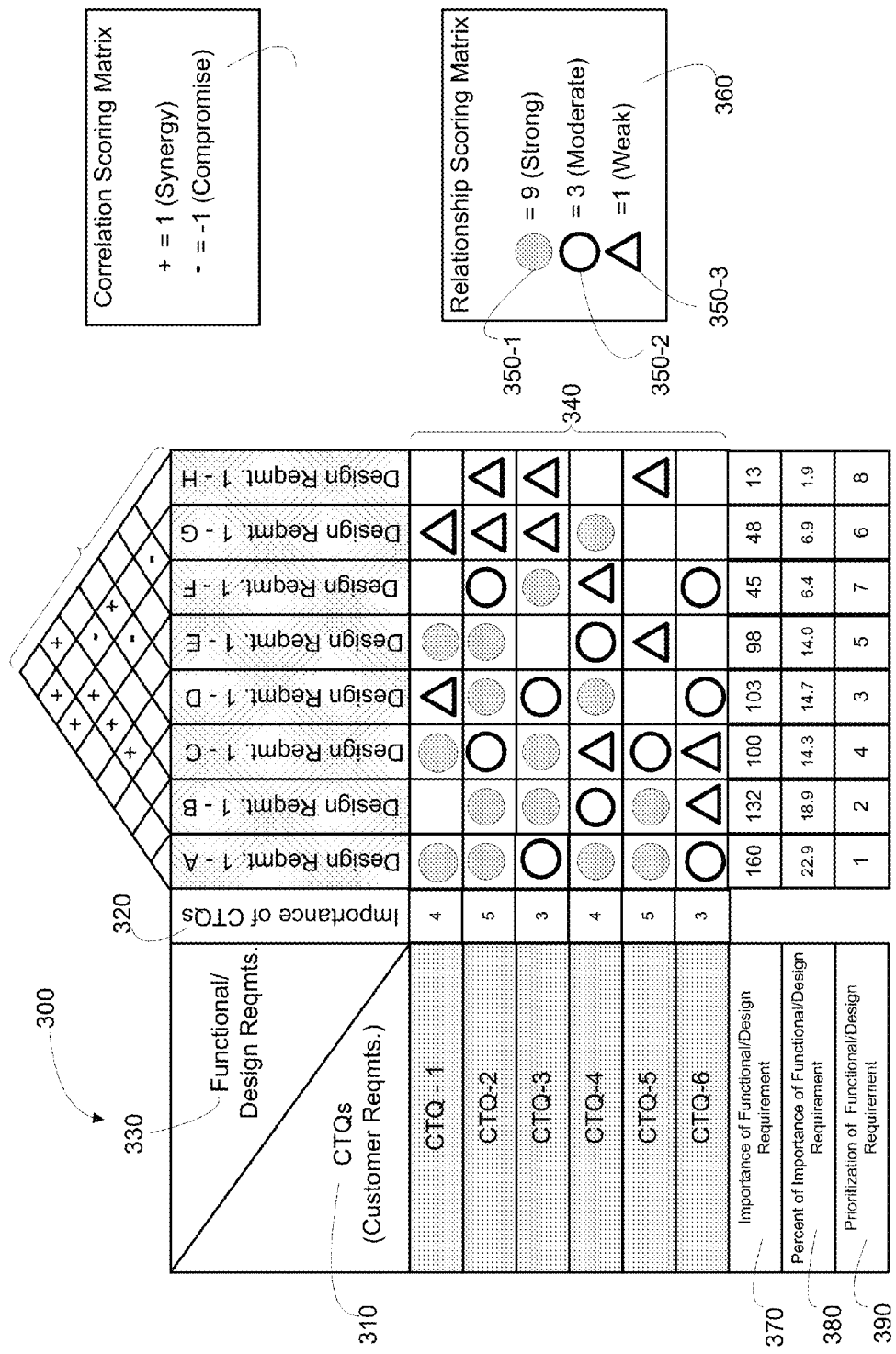
Figure 5:
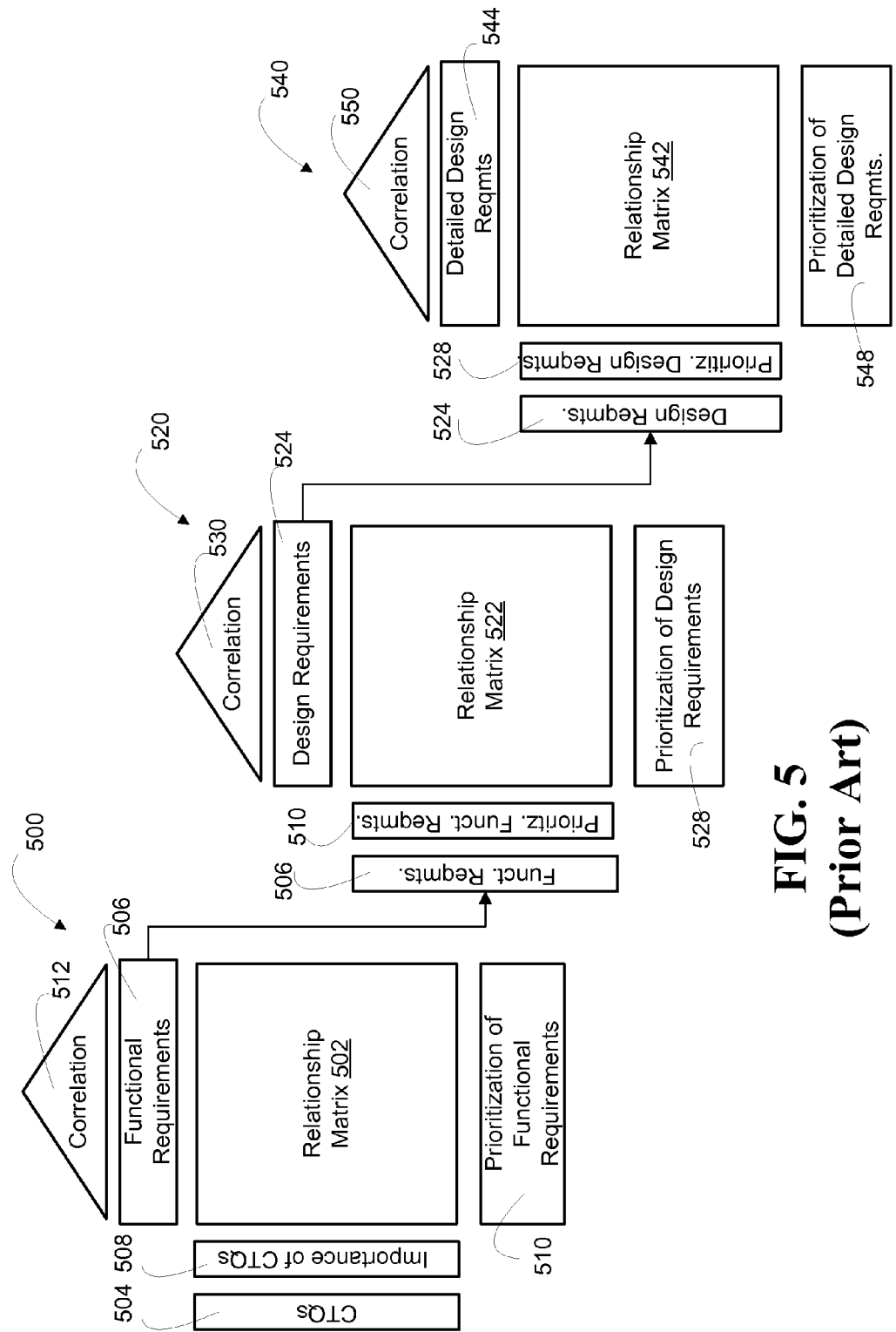
Figure 6:
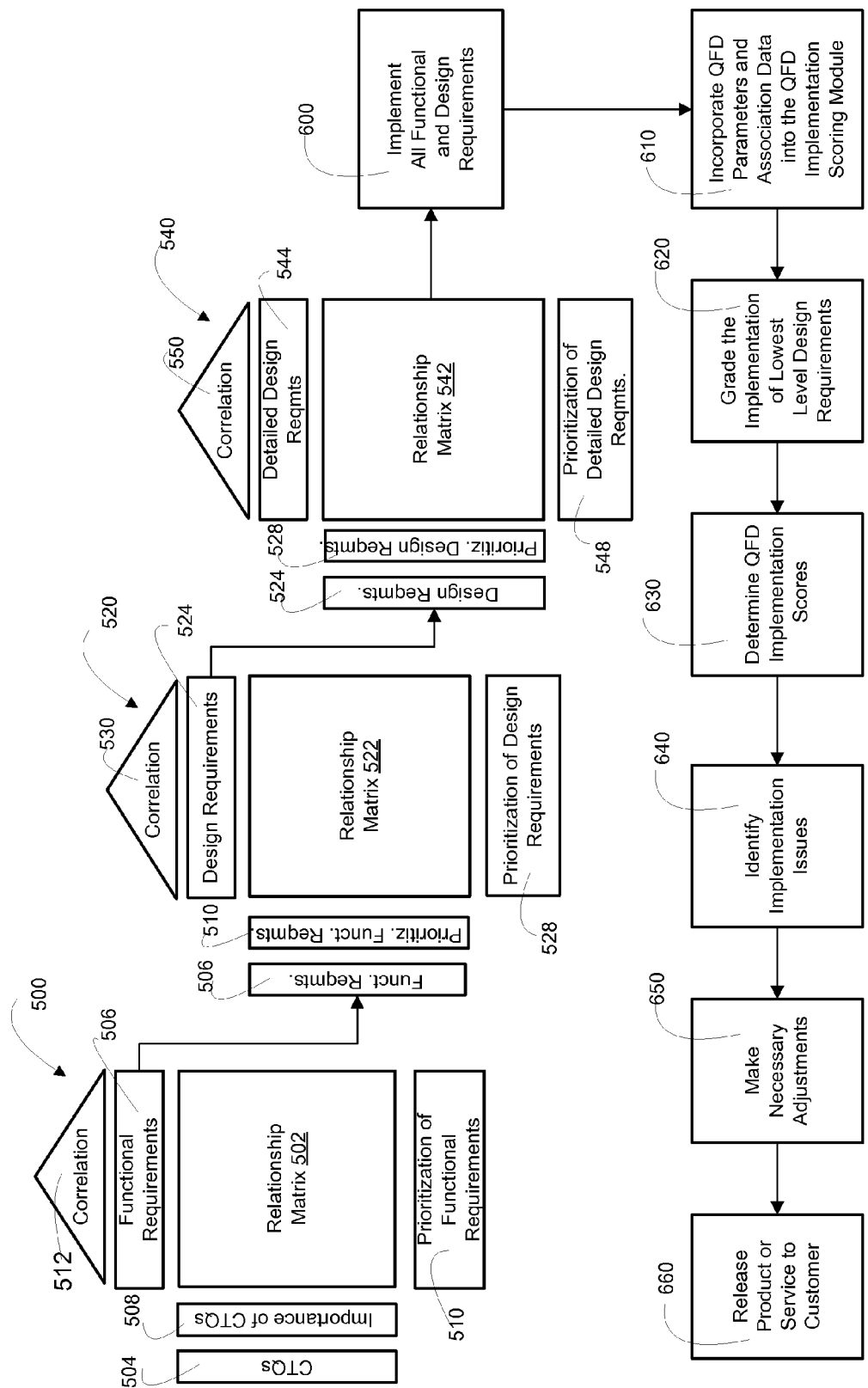
Figure 7:
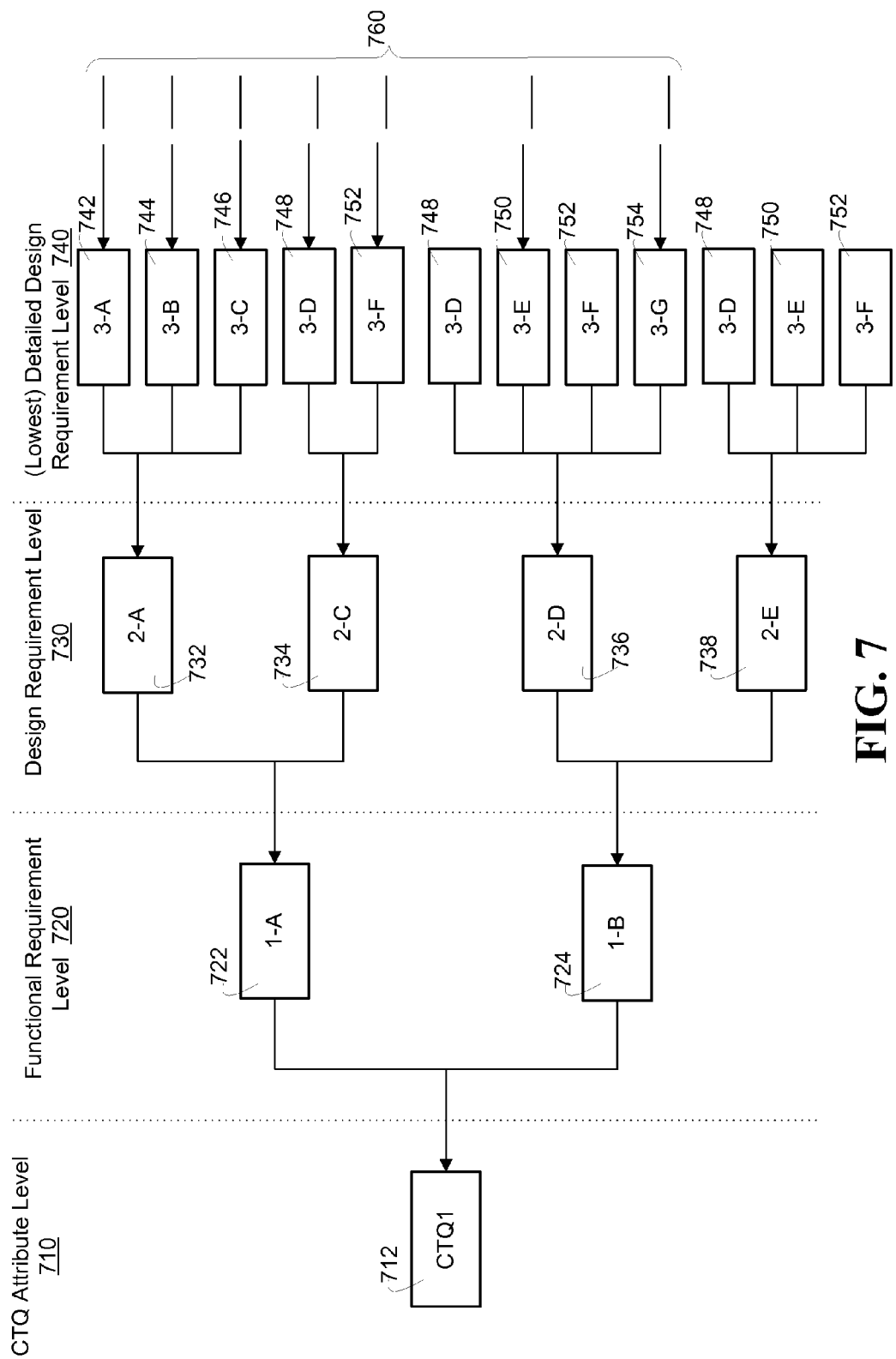
Figure 8:
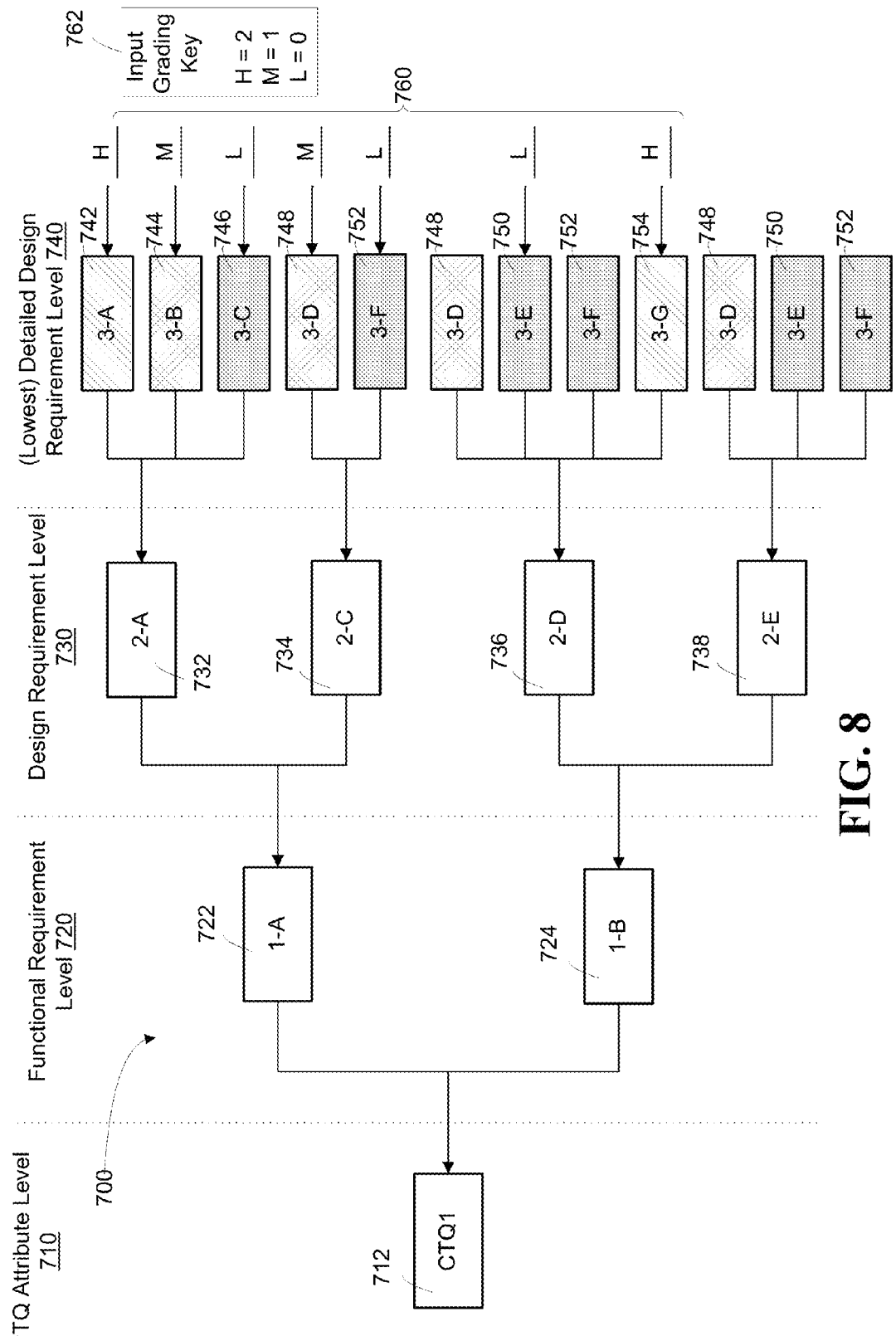
Figure 9:
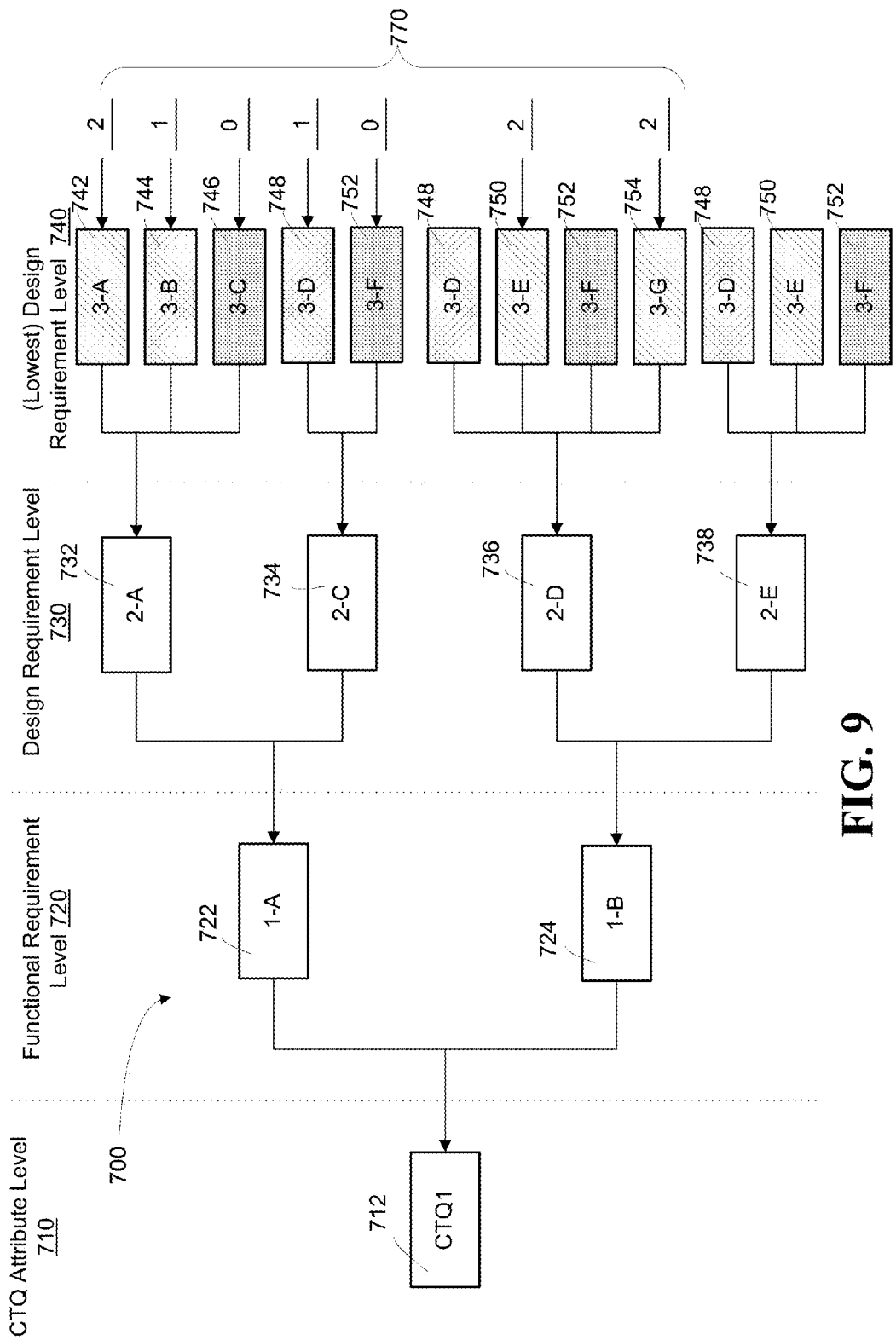
Figure 10:
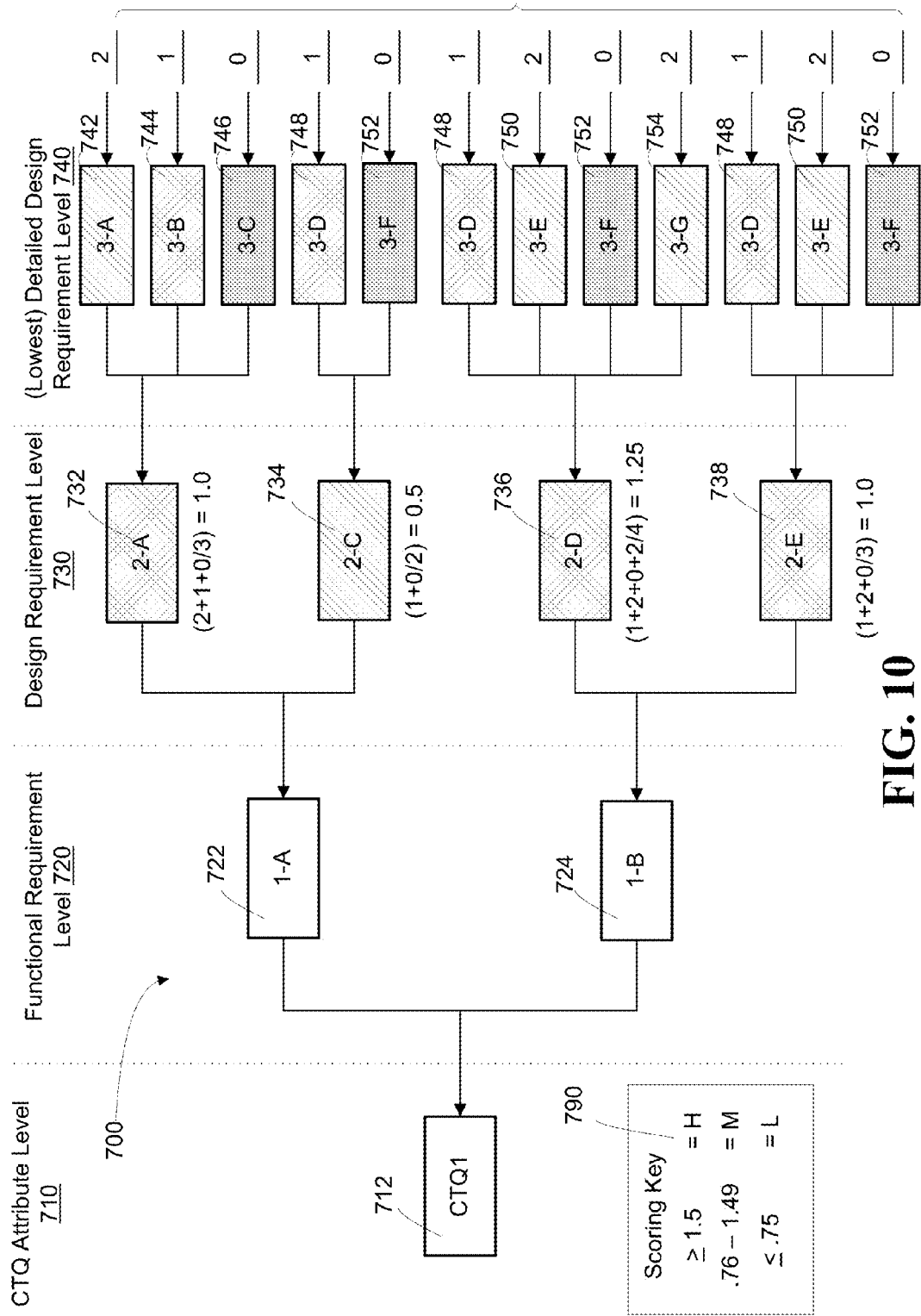
Figure 11:
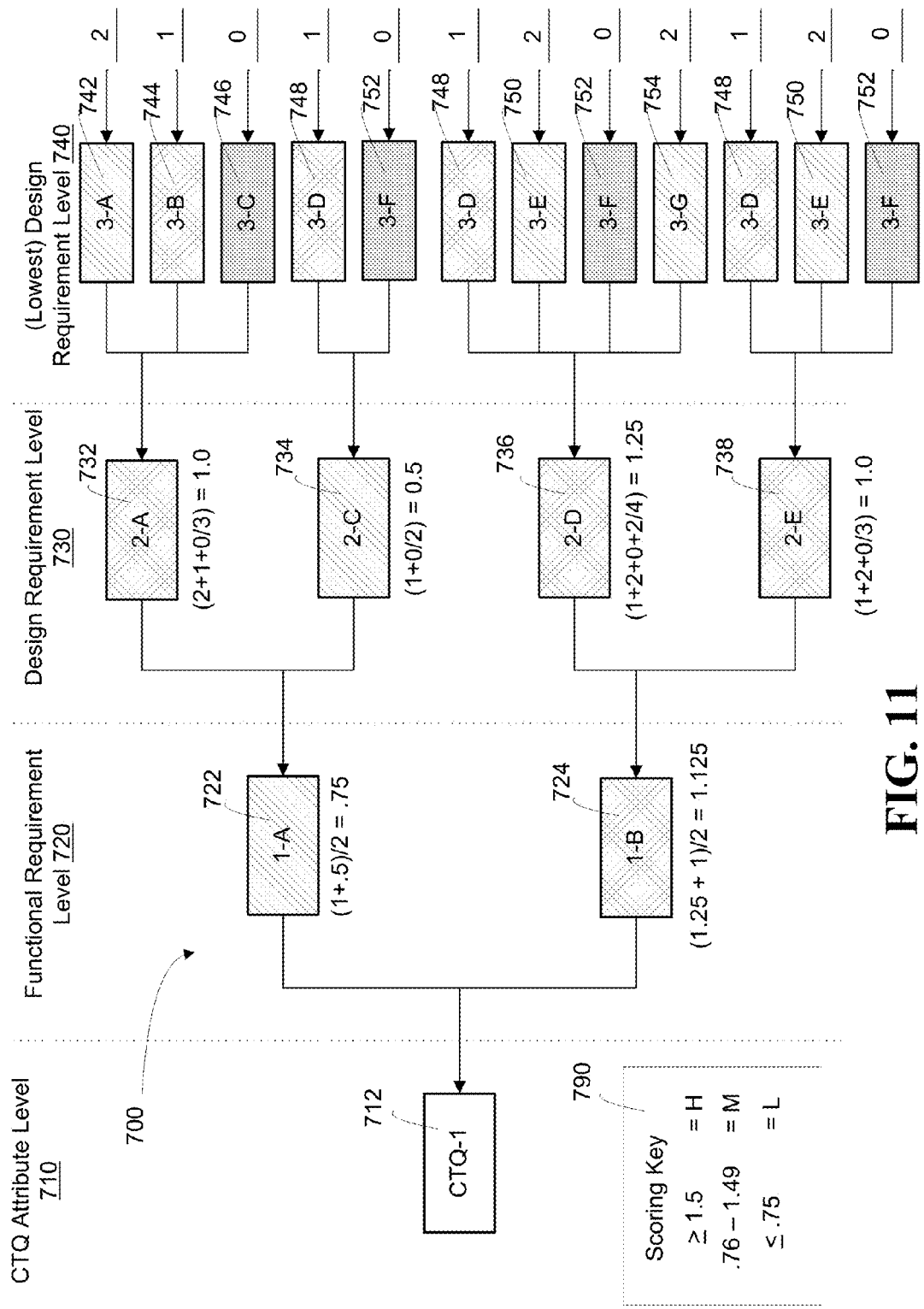
Figure 12:
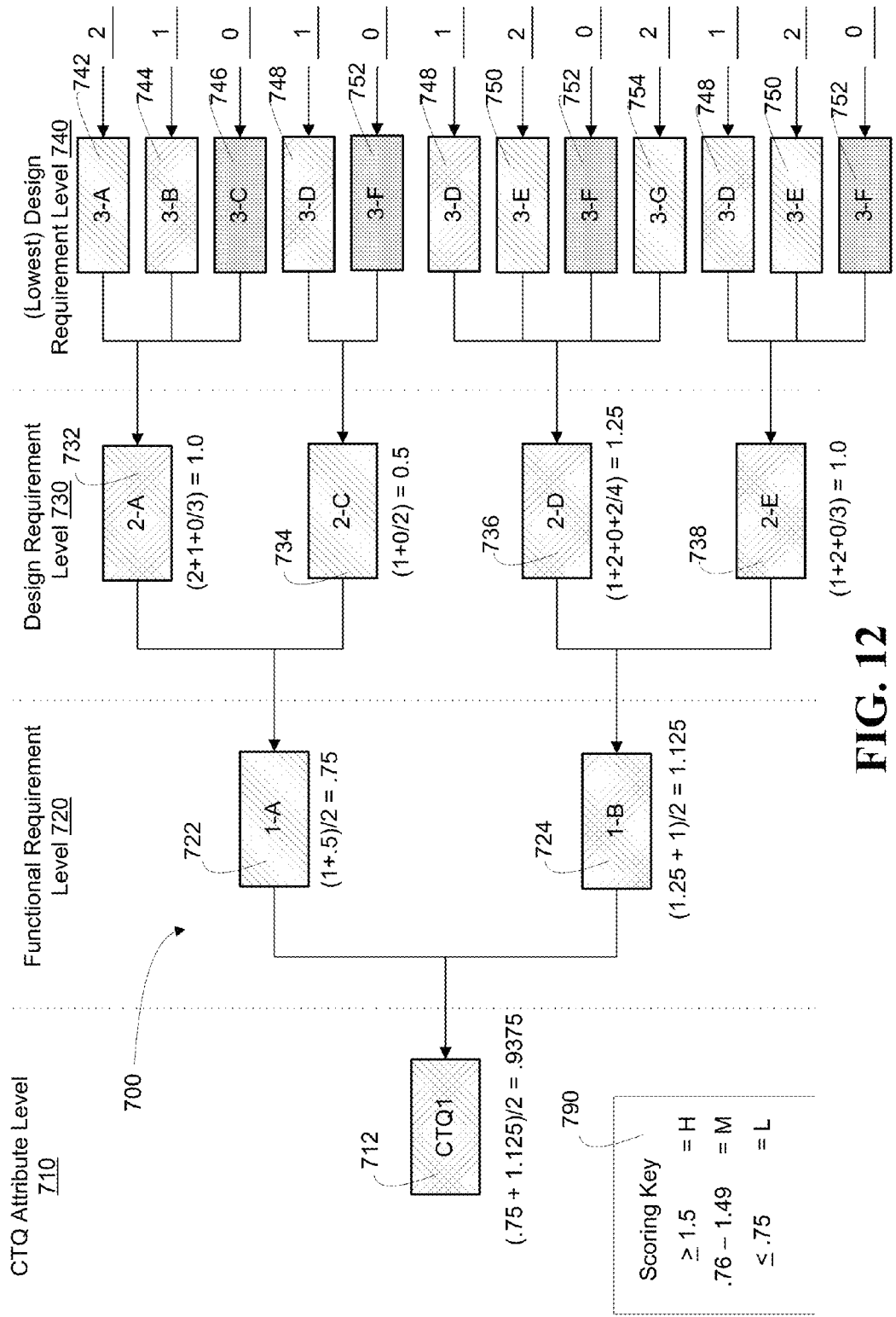
Figure 13:
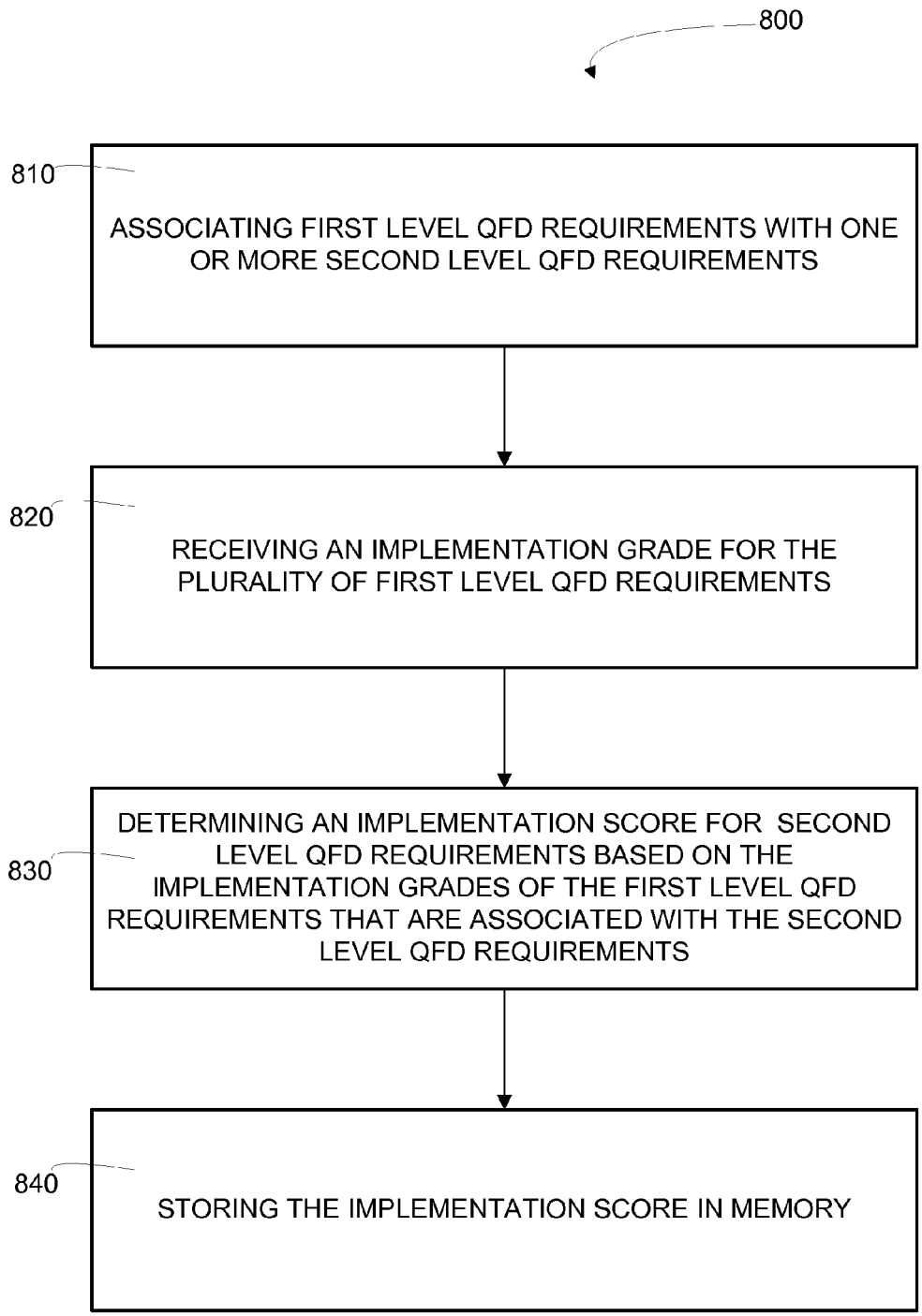

Having thus described embodiments of the invention in general terms, reference will now be made to the accompanying drawings, which are not necessarily drawn to scale, and wherein:

FIG. 1 is a block diagram of a computing device configured to provide for QFD implementation scoring, in accordance with one embodiment of the present invention;

FIG. 2 is a more detailed block diagram of the computing device configured to provide for QFD implementation scoring, in accordance with one embodiment of the present invention;

FIG. 3 is an example of a product planning matrix, otherwise referred to as a House of Quality, as implemented in QFD product planning, in accordance with the prior art;

FIG. 4 is an example of a product planning matrix, otherwise referred to as a House of Quality, as implemented in QFD product planning in which the entries in the matrix have been completed, in accordance with the prior art;

FIG. 5 is a block diagram of a QFD product planning process implementing multiple product planning matrix, in accordance with the prior art;

FIG. 6 is a flow diagram of a multiple product planning matrix QFD product planning process leading into QFD implementation scoring, in accordance with another embodiment of the present invention;

FIG. 7 is a tree structure block diagram highlighting an associated CTQ, functional requirements, design requirements and detailed design requirements, in accordance with an embodiment of the present invention;

FIG. 8 is a tree structure block diagram highlighting an associated CTQ, functional requirements, design requirements and detailed design requirements and detailed design level implementation grading implementation, according to another embodiment of the present invention;

FIG. 9 is a tree structure block diagram highlighting an associated CTQ, functional requirements, design requirements and detailed design requirements and detailed design level implementation grading implementation, according to a further embodiment of the present invention;

FIG. 10 is a tree structure block diagram highlighting an associated CTQ, functional requirements, design requirements and detailed design requirements and design requirement level implementation score determination, according to a further embodiment of the present invention;

FIG. 11 is a tree structure block diagram highlighting an associated CTQ, functional requirements, design requirements and detailed design requirements and functional requirement level implementation score determination, according to a further embodiment of the present invention;

FIG. 12 is a tree structure block diagram highlighting an associated CTQ, functional requirements, design requirements and detailed design requirements and CTQ attribute level implementation score determination, according to a further embodiment of the present invention; and FIG. 13 is a flow diagram of a method for QFD implementation score determination, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Various embodiments or features will be presented in terms of systems that may include a number of devices, components, modules and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, present embodiments provide for methods, systems and computer program products that provide for a quantifiable assessment of the delivery effectiveness of Quality Function Deployment (QFD) planning designs. In this regard, present embodiments provide quantifiable metrics that help a key stakeholder, such as a product or service provider, determine the level of success for each design requirement or Critical-To-Quality (CTQ) attribute defined in the QFD design process. Thus, based on presently described embodiments, the stakeholder can assess how well the deployment of their product or service met the original defined CTQs and/or design requirements and which CTQs and which design requirements related to those CTQs should garner further attention to ensure that the CTQ meets its objective.

Referring to FIG. 1, a block diagram is depicted of a computing device 100 configured to provide Quality Function Deployment (QFD) implementation scoring, in accordance with an embodiment of the present invention. The computing device 100 includes a computing platform 110 having at least one processor 120 and a memory 130. The memory 130 of computing device 100 stored QFD implementation scoring module 140 that is operable to provide quantifiable scores for QFD requirements. The premise for QFD is discussed in relation to FIG. 5, infra. It should be noted that for the purposes of the claimed invention, QFD requirements may include Critical-To-Quality (CTQ) requirements, functional design requirements and/or detailed design requirements.

The QFD implementation scoring module 140 includes QFD implementation scoring logic 150 operable to determine a QFD requirement implementation score 180 for QFD requirements based on user-inputted QFD requirement implementation grades 170 and a QFD association between a graded QFD requirement and a QFD requirement to be scored.

FIG. 2 provides a more detailed depiction of the computing device 100, according to further embodiments of the present invention. In addition to providing greater detail, FIG. 2 highlights various alternate embodiments. The computing device 100 may include any type of computing device, such as a personal computer, a laptop/portable computer, a wireless or handheld computing device, a server or the like. The computing platform 110 is operable to receive and execute modules, routines and applications, such as QFD implementation scoring module 140 and the like. Computing platform 110 includes memory 130, which may comprise volatile and non-volatile memory such as read-only and/or random-access memory (RAM and ROM), EPROM, EEPROM, flash cards, or any memory common to computer platforms. Further, memory 130 may include one or more flash memory cells, or may be any secondary or tertiary storage device, such as magnetic media, optical media, tape, or soft or hard disk.

Further, computing platform 110 also includes processor 120, which may be an application-specific integrated circuit ("ASIC"), or other chipset, processor, logic circuit, or other data processing device. Processor 120 or other processor, such as ASIC, may execute an application programming interface ("API") layer 190 that interfaces with any resident programs, such as QFD implementation scoring module 140, QFD design planning module 220 or the like stored in the memory 130 of the computing device 100.

Processor 120 includes various processing subsystems 200 embodied in hardware, firmware, software and combinations thereof, that enable the functionality of computing device 100 and the operability of the computing device on a network. For example, processing subsystems 200 allow for initiating and maintaining communications, and exchanging data, with other networked devices.

Computing platform 110 additionally includes communications module 210 embodied in hardware, firmware, software, and combinations thereof, that enables communications among the various components of the computing device 100, as well as between the computing device 100 and a network. Thus, communication module 210 may include the requisite hardware, firmware, software and/or combinations thereof for establishing a network communication connection.

As noted in FIG. 1, the QFD implementation scoring module 140 includes QFD implementation scoring logic 150 operable to determine a QFD requirement implementation score 180 for QFD requirements based on user-inputted QFD requirement implementation grades 170 and a QFD association between a graded QFD requirement and a QFD requirement to be scored.

According to one embodiment of the present invention, the QFD implementation module imports or otherwise receives QFD requirement association data 160 from a QFD design planning module 220, which may be stored in the memory 130 of computing device 100, as shown in FIG. 2, or it may be stored and executed on another computing device. The QFD requirement association data 160 may be automatically imported from a QFD design planning module 220 or the association data may be manually entered into the QFD implementation scoring module 140. The association data 160 defines which QFD requirements are associated or have a relationship with other QFD requirements.

In accordance with conventional QFD processing relationship/association scoring is performed at each QFD level, such that relationships/associations are defined between one level of design requirements and the next lowest level of design requirements. For example, if the highest level of QFD requirements is the CTQ requirements, relationship scoring is conducted between the defined CTQ requirements and the next lower level of requirements, such as defined functional design requirements. In turn, relationship scoring is conducted between the defined functional design requirements and the next lower level requirements, such as defined detailed design requirements. Relationship/association scoring is used in QFD to assess the strength of the relationship between requirements at adjoining levels. Additionally, the relationship/association scoring is used in QFD to assess the importance of a requirement and to prioritize the importance of the requirements.

In certain embodiments of the QFD design planning module 220, relationship/association scoring may be numeric in nature, such that a score of "9" indicates a strong relationship/association for the requirements, a score of "3" indicates a moderate relationship/association and a score of "1" indicates a low relationship/association. In accordance with embodiments of the present invention, "association", in terms of QFD implementation grading, may be any form of relationship/association defined in the QFD design planning module 220. For example, in the numeric scoring scale described above, any relationship score equal to or above the minimum score of "1" may constitute an association for the sake of QFD implementation scoring. In other embodiments, an "association", in terms of QFD implementation scoring, may provide for a threshold to be met in the relationship/association scoring within the QFD design planning module 220. For example, in the numeric scoring scale provided above, the threshold for QFD implementation association may be any relationship score equal to or above the moderate level score of "3".

The QFD implementation scoring module 140 further provides for a user to input implementation grades 170 for one or more QFD requirements. The implementation grades 170 are a subjective grade that assesses the overall effectiveness of the QFD requirement at deployment. The implementation grade 170 may be a numeric grade or some other form of grade, such as an alphabetic grade (i.e., alpha-grade), which may subsequently be converted to a numeric grade in accordance with a predefined scale. In one specific embodiment, in order to provide for a simplified grading of the QFD requirements, the user may provide a grade of "H" for high, "M" for medium and "L" for low to signify that a graded QFD requirement has high effectiveness at deployment, medium effectiveness at deployment or low effectiveness at deployment. As noted, the alpha-grades are subsequently converted to a numeric grade for the purpose of determining QFD requirement scores for other requirements of the QFD.

For example, the module may be configured to receive user-inputted implementation grades 170 for all of a particular level of QFD requirements. In order for the QFD requirement implementation scores 180 to be determined for all of the QFD requirements, the module may be configured to receive implementation grades 170 for all of the QFD design requirement on the lowest design level, i.e., the most detailed design requirement level. In such embodiments, once the implementation grades 170 of the lowest-leveled QFD design requirements have been inputted, the QFD implementation scoring logic 150 can systematically determine the QFD requirement implementation scores 180 for each QFD requirement in each of the higher QFD requirement levels, level-by-level, based on the inputted implementation grades 170 and the association data 160.

The QFD implementation scoring module 140 may additionally include a QFD implementation score comparison logic 230 operable to compare QFD requirement implementation scores 180 to QFD implementation score thresholds 240. The QFD implementation score thresholds 240 provide for implementation score for any QFD requirement to be classified according to thresholds. For example, in one embodiment, three QFD implementation score thresholds 240 are defined such that three distinct classifications of implementation scores exist. The three implementation score classifications may correspond to a low implementation score, a medium implementation score and a high implementation score, signifying that the requirement has been scored to indicate a low level of implementation, a medium level of implementation or a high level of implementation.

For the sake of understanding QFD implementation scoring, it is important that the reader have a basic understanding of QFD and the concepts related to a QFD design planning module 220. Therefore, FIGS. 3-5 are herein presented, which provide for an overview of QFD design planning, in accordance with the prior art.

FIGS. 3 and 4 are exemplary diagrams of a product planning matrix, otherwise referred to in QFD terminology as a "House of Quality", in accordance with the prior art. FIG. 3 reflects an example of a blank product planning matrix and FIG. 4 reflects a product planning matrix in which fields of the matrix have been filled-in.

The planning matrix 300 is initiated by defining customer requirements 310, otherwise referred to as Critical-To-Quality (CTQ) requirements. The customer requirements are shown on the left-hand side of the planning matrix 300 and are identified as CTQ-1, CTQ-2, CTQ-3, CTQ-4, CTQ-5 and CTQ-6. The CTQ requirements reflect the desired market segment(s) and address unspoken needs. CTQ requirements may be the output of surveys, customer meetings, focus groups or the like. If the number of identified CTQs is large, the planning matrix 300 may need to be decomposed into smaller modules/subsystems to reduce the number of requirements in a matrix.

For each customer requirement, a customer priority is assigned and stated in the planning matrix under the column "Importance of CTQs" 320. The customer priority may be based on a numeric scale, for example a rating between 1 to 5. Customer priorities may be identified using ranking techniques, paired comparisons or the like. In the illustrated example of FIG. 4, CTQ-1 has been assigned a priority of 4; CTQ-2 has been assigned a priority of 5; CTQ-3 has been assigned a priority of 3; CTQ-4 has been assigned a priority of 4; CTQ-5 has been assigned a priority of 5; and CTQ-6 has been assigned a priority of 3.

Once the CTQs 310 have been identified a product strategy is developed. The product strategy may be based on prior generation products, competitive products, identification of price points, identification of market segments, warranty, service, reliability, customer complaint problems and the like. Based on the product strategy and CTQs 310, functional/design requirements 330 are defined which respond to customer requirements. Functional/design requirements 330 are shown along a top portion of the planning matrix 300 and are identified as design requirement 1-A, design requirement 1-B, design requirement 1-C, design requirement 1-D, design requirement 1-E, design requirement 1-F, design requirement 1-G and design requirement 1-H. Functional/design requirements are characteristically meaningful, measurable and stated in a way to avoid implying a particular technical solution so as to not constrain the designers.

Once the CTQs 310 and the functional/design requirements 330 have been identified, relationships are developed between the CTQs and the functional/design requirements. In planning matrix 300, the relationships are identified in the relationship matrix portion 340. FIG. 4 illustrates the relationship matrix portion 340 having relationship identifiers 350 distributed throughout the relationship matrix portion 340, which indicate the level of the relationship between the CTQs 320 and the functional/design requirements 330. As indicated in the relationship scoring matrix block 360, a shaded circle 350-1 indicates a strong relationship, a nonshaded circle 350-2 indicates a moderate relationship and a triangle 350-3 indicates a weak relationship. Each of the indicators is assigned a numeric value for the sake of subsequently calculating other design planning metrics. In the illustrated example of FIG. 4 a strong relationship is assigned a value of 9, a moderate relationship is assigned a value of 3 and a weak relationship is assigned a value of 1. If no relationship exists between a CTQ 320 and a functional/design requirement 330 the corresponding entry in the relationship matrix portion 340 is left blank.

For purposes of the present invention, according to one embodiment, the threshold for defining an association or relationship for the purpose of implementation scoring is if the CTQ and functional/design requirement (or functional/design requirement and functional/design requirement) are identified as having a relationship. Thus, according to such an embodiment, a weak, moderate or strong relationship would satisfy the association threshold. In other embodiments of the invention, a different threshold may be used to determine if the CTQ and functional/design requirement (or functional/design requirement and functional/design requirement) should be associated. In accordance with one embodiment of the invention, implementation scoring may treat all of the relationships the same, for the purpose of determining implementation scores, regardless of the strength of the relationship. In other embodiments of the invention, the strength of the relationship may be used to determine or assign a weighting value to the association.

The importance of the functional/design requirement is indicated by Importance of Functional/Design Requirement row 370. The entry in row 370 is determined by multiplying the numeric value of the relationship identifier 350 by the Importance of the CTQ value in column 320 and adding all of the products together to determine the Importance of Design Requirement value. Once an Importance of Design Requirement value has been determined for all of the functional/design requirements, it is possible to determine the percentage of importance of each functional/design requirement as indicated in the Percentage of Importance of Design Requirement row 380. A ranking of the functional/design requirements in terms of their importance is provided in Prioritization of Design Requirement row 390.

In addition to the relationship matrix portion 340, the planning matrix or House of Quality may include a correlation matrix portion 400 (otherwise referred to as the roof of the House of Quality). The correlation matrix portion 400 serves to identify correlations between the functional/design requirements 330. In the illustrated example of FIG. 4, correlation identifiers 410 indicate the correlation between two different functional design/requirements. As indicated in the relationship scoring matrix block 420, a plus sign 410-1 indicates a synergy of correlation and a minus/negative sign 410-2 indicates a compromise in terms of correlation. Each of the correlation identifiers is assigned a numeric value for the sake of subsequently calculating other design planning metrics. In the illustrated example of FIG. 4, a synergistic correlation is assigned a value of 1 and a compromise correlation is assigned a numeric value of −1. It should be noted that for present embodiments of the invention, while correlation scoring data is not typically used in determining an association for the sake of implementation scoring, it is not outside of the inventive concepts herein disclosed that the correlation scoring data be used to determine or otherwise assess association between functional/design requirements.

Other product/service planning matrices may include other ratings, scorings or the like (not shown in FIGS. 3 and 4). For example, other planning matrices may rely on a difficulty rating for each of the functional/product requirements that serves to assess the difficulty of implanting the functional/design requirement.

Referring to FIG. 5, a block diagram is depicted that illustrates a QFD product planning in which multiple product planning matrices/"House of Quality" are implemented to take into account the various levels of CTQ and functional/design requirements, in accordance with the prior art. The first level product planning matrix 500 provides for a relationship matrix 502 between high-level CTQs 504 and functional requirements 506. In addition, the first level product planning matrix 500 includes fields for Importance of CTQs 508, Prioritization of Functional Requirements 510 and a correlation matrix 512. Thus, the relationship matrix 502 provides association data that is implemented in the implementation scoring of the present invention, specifically, associations between the CTQs 504 and the Functional Requirements 506, which also factors in the Importance of CTQs 508 as a weighting of the CTQs 504.

The second level product planning matrix 520 provides for a relationship matrix 522 between the functional requirements 506 (as defined in the first level product planning matrix 500) and higher level design requirements 524. In addition, the second level product planning matrix 520 includes fields for Prioritization of Functional Requirements 510, Prioritization of Design Requirements 528 and a correlation matrix 530. Thus, the relationship matrix 502 provides association data that is implemented in the implementation scoring of the present invention, specifically, associations between the functional requirements 506 and the design requirements 524, which also factors in the Prioritization of Functional Requirements 510 as a weighting for the Functional Requirements 506.

The third level product planning matrix 540 provides for a relationship matrix 542 between the design requirements 524 (as defined in the second level product planning matrix 520) and lower level detailed design requirements 544. In addition, the third level product planning matrix 540 includes fields for Prioritization of Design Requirements 528, Prioritization of Detailed Design Requirements 548 and a correlation matrix 550. Thus, the relationship matrix 542 provides association data that is implemented in the implementation scoring of the present invention, specifically, associations between the Design Requirements 524 and the detailed design requirements 544, which also factors in the Prioritization of Design Requirements 528 as a weighting for Design Requirements 524.

While the QFD product planning example illustrated in FIG. 5 depicts three levels of product planning, other QFD product planning schemes may implement more or less product planning matrix depending on the complexity or simplicity of the product or service being designed.

Turning the reader's attention to FIG. 6, the exemplary QFD product planning matrix/"House of Quality" of FIG. 5 are incorporated into a flow diagram, which illustrates a method for QFD implementation scoring, in accordance with embodiments of the present invention. Once the QFD product planning matrix 500, 520 and 540 have been completed, at Event 600, all of the functional and design requirements flowing from the product planning matrix are implemented.

At Event 610, the QFD parameters, such as the CTQs, the functional requirements, the design requirements and the detailed design requirements are incorporated into the QFD implementation scoring module. In addition, the association data, which associates CTQs, functional requirements, design requirements and/or detailed design requirements, is imported from the planning matrix or otherwise inputted into the QFD implementation scoring module.

At Event 620, QFD implementation grades are inputted for the lowest level design requirements, i.e., the most detailed level of design requirements. Based on the inputted implementation grades and the association data, at Event 630, QFD implementation scores are determined for all other QFD parameters, such as the CTQs, the functional requirements and any design requirements higher than the lowest level design requirements, i.e., the design requirements which were implementation graded.

At Event 640, based on the determined implementation scores, implementation issues/concerns are identified. In one embodiment, implementation issues/concerns may be automatically identified via implementation score thresholds that are compared to the implementation scores. For example, if a given implementation score falls below a predetermined threshold, the QFD parameter corresponding to the implementation score may be deemed low in terms of implementation success and, therefore, worthy of further remedial action.

At Event 650, necessary adjustments are made to the QFD parameters that have been identified as having implementation issues. In certain embodiments after the necessary adjustments have been made, the QFD implementation scoring module may be re-executed to ensure that the implementation issues previously determined have been adequately resolved. At Event 660, once the remedial actions have rectified the implementation issues, the product or service is released to the customer.

FIGS. 7-12 depict sequential examples of how the QFD requirement implementation scoring module functions to determine implementation scores, according to embodiments of the present invention. FIG. 7 provides a tree structure block diagram highlighting an associated CTQ, functional requirements, design requirements and detailed design requirements, in accordance with an embodiment of the present invention. In a typical QFD implementation scoring application, multiple trees may exist, since each tree has a CTQ as the root element and most, if not all, QFD product planning processes will have multiple CTQs. The tree structure 700 includes CTQ attribute level 710, functional requirement level 720, design requirement level 730 and detailed or lowest design requirement level 740. CTQ attribute level 710 includes one CTQ, identified as CTQ1 712. Functional requirement level 720 includes two functional requirements that are associated with CTQ1 712: 1-A 722 and 1-B 724. Design requirement level 730 includes four design requirements; 2-A 732 and 2-C 734 that are associated with functional requirement 1-A 722; and 2-D 736 and 2-E 738 that are associated with functional requirement 1-B 724.

Detailed design requirement level 740 includes seven detailed design requirements: 3-A 742, 3-B 744 and 3-C 746 that are associated with design requirement 2-A 732; 3-D 748 that is associated with design requirements 2-C 734, 2-D 736 and 2-E 738; 3-E 750 and 3-F 752 that are associated with design requirements 2-D 736 and 2-E 738; and 3-G 754 that is associated with design requirement 2-D 736. The detailed design requirement level includes implementation grade score input fields 760 for inputting a user-defined implementation grade for each of the detailed design requirements 742-754. As previously noted, the implementation grades are subjective grades that assess the success of the implementation of each requirement on the lowest level/detailed design requirements.

FIG. 8 illustrates the tree structure block diagram highlighting inputted QFD implementation grades for the detailed design level, in accordance with an embodiment of the present invention. The QFD implementation grade is a subjective grade that is based on the relative success of the implementation of the QFD requirement being graded. In the embodiment shown in FIG. 8, a user has provided QFD implementation grades in the form of alphabetic identifiers 760, which grade the QFD implementation as high, medium or low. As shown in the input grading key 762, once the alphabetic identifier 760 is inputted, it is subsequently converted to a numeric grade for the purpose of determining QFD implementation scores for other requirements. In one embodiment, the number of possible implementation grades is kept to a minimum so as to simplify the grading process. Thus, in the illustrated example of FIG. 8, only three possible implementation grades are utilized.

In the illustrated example of FIG. 8, the user has provided implementation grades in the form of alphabetic identifiers 760 to all of the lowest level, i.e., most detailed design requirements, 3A-3G 742-754. By providing implementation grades for all of the lowest level design requirements the QFD implementation scoring modules are able to provide scores for all of the remaining (i.e., higher level) requirements in the QFD design planning process, up to and including the CTQs. In other embodiments, in which a user may provide implementation grades for only a portion of the lowest level design requirements, implementation scores may be limited to only those QFD requirements in which all associated lower level requirements have been graded.

It is also noted that while the tree structure 700 shows multiple occurrences of certain detailed design requirements in the detailed design requirement level 740, the user need only provide a grade to one occurrence and the grade will then be reflected in the other occurrences. For example, in the FIG. 8 embodiment, 3-D 748 occurs three times in the detailed design requirement level because it has association with three different design requirements in the design requirement level: 2-C 734, 2-D 736 and 2-E 738. However, the user need only provide an implementation grade to one of the occurrences of 3-D 748 in the detailed design requirement level 740 to have it reflected in all three occurrences in level 740.

In addition, in accordance to one embodiment of the invention, as shown by the shading used in FIG. 8, the user interface of the QFD implementation scoring module 140 may provide for shading or color coding of the QFD detailed design requirements as they are graded to indicate the grade provided. For example, a predetermined color or shading is provided to a requirement graded as high, another predetermined color or shading is provided to a requirement graded as medium and still another predetermined color or shading is provided to a requirement graded as low.

FIG. 9 illustrates the tree structure block diagram highlighting inputted QFD implementation grades for the detailed design level, in accordance with another embodiment of the present invention. In the embodiment shown in FIG. 9 a user has provided QFD implementation grades in the form of numeric implementation grades 770, which grade the QFD implementation as zero, one or two, in which zero corresponds to a low level of implementation success, one corresponds to a medium level of implementation success and two corresponds to a high level of implementation success. Similar to the embodiment of FIG. 8, the number of possible implementation grades is kept to a minimum so as to simplify the grading process. Thus, in the illustrated example of FIG. 9, only three possible numeric implementation grades 770 are utilized.

By providing for input of numeric implementation grades 770, as opposed to alphabetic identifiers 760, conversion of the numeric implementation grades is not required prior to determination of QFD implementation scores. While conversion of the numeric implementation grades is not required, it may be necessary to scale the numeric implementations grades 770 accordingly as deemed by the logic used in the determination and/or any weighting factors applied to the requirements being graded.

Additionally as shown and described in FIG. 8, the tree structure 700 of FIG. 9 shows multiple occurrences of certain detailed design requirements in the detailed design requirement level 740 and the user need only provide a numeric grade to one occurrence and the grade will then be reflected in the other occurrences.

Referring to FIG. 10, a tree structure block diagram is depicted in which design requirement level 730 requirements have determined implementation scores, according to an embodiment of the present invention. As shown in FIG. 10, QFD implementation scores have been determined for the design requirements 2-A 732, 2-C 734, 2-D 736 and 2-E 738 based on associations with detailed design requirements and the grade provided to the associated detailed design requirements. In the illustrated example of FIG. 10, the implementation score is determined based on straight averaging of the implementation grades provided to those detailed design requirements associated with the design requirement on the design requirement level 730. For example, the QFD implementation score for 2-A 732 is the sum of the associated detailed design requirements 3-A 742, 3-B 744 and 3-C 746 grades (2+1+0) divided by the number of associated detailed design requirements (3). Thus, the determined QFD implementation score for 2-A 732 is one (1). Similarly, in likewise fashion, QFD implementation scores are determined for the other design requirements, 2-C 734, 2-D 736 and 2-E 738 in the design requirement level 730. In other embodiments of the invention, the QFD implementation scoring determination may take into account weighting factors assigned to the associated QFD requirements, so as to account for the relative importance of each QFD requirement as it applies to the QFD requirement being scored.

In addition, in accordance to one embodiment of the invention, as shown by the shading used in FIG. 10, the user interface of the QFD implementation scoring module 140 may provide for shading or color coding of the QFD design requirements as they are scored to indicate the score determined. The scoring key 790 indicates that a score at or below 0.75 may be categorized as low, a score between 0.76 and 1.49 may be categorized as medium and a score at or above 1.50 may be categorized as high. Thus, for example, a predetermined color or shading is provided to a requirement scored as high, another predetermined color or shading is provided to a requirement scored as medium and still another predetermined color or shading is provided to a requirement scored as low. Such color coding allows the user to easily identify QFD requirements and/or CTQs that are scored as low and, thus, may require further remedial actions prior to releasing the product/service to the consumer.

Referring to FIG. 11, a tree structure block diagram is depicted in which functional requirement level 720 requirements have determined implementation scores, according to an embodiment of the present invention. As shown in FIG. 11, QFD implementation scores have been determined for the functional requirements 1-A 722 and 1-B 724 based on associations with design requirements and/or detailed design requirements and the grade provided to the associated detailed design requirements or the score determined for the associated design requirements. In the illustrated example of FIG. 11, the implementation score is determined based on straight averaging of the implementation scores determined for those design requirements associated with the functional requirement on the functional requirement level 720. For example, the QFD implementation score for 1-A 722 is the sum of the associated design requirements 2-A 732, and 2-C 734 scores (1+0.5) divided by the number of associated design requirements (2). Thus, the determined QFD implementation score for 1-A 722 is 0.75. Similarly, in likewise fashion, a QFD implementation score is determined for the other functional requirement in tree structure 700, 1-B 724 in the functional requirement level 720. In other embodiments, as it should be apparent to those skilled in the art, the QFD implementation score for the functional requirements may be determined based on the associations flowing back to the detailed design requirement level 740 and the implementation grades provided to the associated detailed design requirements.

Referring to FIG. 12 a tree structure block diagram is depicted in which CTQ attribute level 710 requirement has a determined implementation score, according to an embodiment of the present invention. As shown in FIG. 12, QFD implementation scores have been determined for all the requirements including the CTQ attribute CTQ1 712 based on associations with design requirements and/or detailed design requirements and/or functional requirements and the grade provided to the associated detailed design requirements or the score determined for the associated design requirements and/or functional requirements. In the illustrated example of FIG. 12, the implementation score for the CTQ attribute is determined based on straight averaging of the implementation scores determined for those functional requirements associated with the CTQ attribute. For example, the QFD implementation score for CTQ1 is the sum of the associated functional requirements 1-A 722, and 1-B 724 scores (0.75+1.125) divided by the number of associated functional requirements (2). Thus, the determined QFD implementation score for CTQ1 712 is 0.9375. In other embodiments, as it should be apparent to those skilled in the art, the QFD implementation score for the CTQ attribute may be determined based on the associations flowing back to the detailed design requirement level 740 and the implementation grades provided to the associated detailed design requirements.

Finally, referring to FIG. 13, a flow diagram 800 is depicted of a method for determining QFD implementation scores, according to an embodiment of the present invention. At Event 810, first level QFD requirements are associated with one or more second level QFD requirements. In accordance with one embodiment of the invention associations are determined based on the QFD product planning process and are imported or otherwise inputted into the module/logic that will subsequently determine implementation scores. Additionally, in accordance with one embodiment of the invention, the first level QFD requirements are the lowest level or most detailed level of requirements in the design process.

At Event 820, an implementation grade is received for the plurality of first level QFD requirements. In most instances, the implementation grade is a subjective grade of the relative success of the implementation process implemented by a user or key stakeholder. According to one embodiment, the implementation grade may be an alphabetic identifier that corresponds to a numeric grade or, according to another embodiment, the grade may be a numeric grade. In most embodiments, the number of grading options is kept to a minimum so as to simplify the overall implementation grading process.

At Event 830, implementation scores are determined for the second level QFD requirements based on the implementation grades for the first level QFD requirements that are associated with the second level QFD requirements. In accordance with one embodiment of the invention, the QFD implementation score may be determined based on a straight averaging of all of the grades of the first level QFD requirements associated with the second level QFD requirement being scored. In other embodiments, predetermined weighting of the associated first level QFD requirement grades may be implemented to determine a QFD implementation score.

At Event 840, the determined second level QFD implementation scores are stored in memory. In accordance with optional embodiments, prior to storing the QFD implementation scores in memory, the QFD implementation scores may be compared to predetermined thresholds to determine if a QFD requirement should be identified as having a QFD implementation score that corresponds to a requirement requiring further remedial action prior to rectifying implementation concerns.

Thus, methods, devices, systems and computer program products are described herein that provide for a quantifiable assessment of the delivery effectiveness of Quality Function Deployment (QFD) planning designs. In this regard, present embodiments provide quantifiable metrics that help a key stakeholder, such as a product or service provider, determine the level of success for each design requirement or Critical-To-Quality (CTQ) attribute defined in the QFD design process. Thus, based on presently described embodiments, the stakeholder can assess how well the deployment of their product or service met the original defined CTQs and/or design requirements and which CTQs and which design requirements related to those CTQs should garner further attention to ensure that the CTQ meets its objective. In accordance with presently described embodiments, traceability in terms of quantifiable metrics is provided back to the highest detail level within a QFD design, such as a CTQ level, through each intermediary detail level to the final list of low detail level design requirements. As such, the user of the present embodiments can follow the linkage from the highest detail level CTQs to the lowest detail level design requirements and make adjustments as necessary to further improve the quality of the product or service.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for assessing the effective delivery of Quality Function Deployment (QFD) design planning, comprising:
    associating a plurality of lowest detail level QFD requirements with one or more of a plurality of second level QFD requirements, wherein the QFD requirements are defined for a design of a product or service and the second level is a next level above the lowest detail level;
    implementing the lowest level QFD requirements and the second level QFD requirements;
    receiving, via a computing device, an implementation grade for the plurality of lowest detail level QFD requirements, wherein the implementation grade is an indicator of how effective a corresponding lowest detail level QFD requirement has been implemented;
    determining, via a computing device processor, an implementation score for each of the plurality of second level QFD requirements by averaging the implementation grades of each lowest detail level QFD requirement that is associated with a corresponding second level QFD requirement to determine the implementation score of the corresponding second level QFD requirement, wherein the implementation score is an indicator of how effective the corresponding second level QFD requirement has been implemented;
    comparing, via a computing device processor, the implementation scores to predefined implementation score thresholds;
    categorizing, via a computing device processor, implementation success for each of the second level QFD requirements as one of low success, medium success or high success based on the comparison of the implementation scores to the predefined implementation score thresholds; and
    prior to releasing the product or service to customers, executing remedial actions based on the second level QFD requirement being categorized as low success.

2. The method of claim 1, wherein determining the implementation score for each of the plurality of second level QFD requirements further defines each of the plurality of second level QFD requirements as including at least one of QFD design requirements, QFD functional requirements or Critical-To-Quality (CTQ) attributes.

3. The method of claim 1, wherein associating the plurality of lowest detail level QFD requirements with the one or more of the plurality of the second level QFD requirements further comprises associating the plurality of lowest detail level QFD requirements with the one or more of the plurality of the second level QFD requirements based on QFD relationship matrix scoring values.

4. The method of claim 1, wherein receiving the implementation grade further comprises receiving, via the computing device, a numeric implementation grade for the plurality of lowest detail level QFD requirements, wherein the numeric implementation grade is based on a predetermined numeric grading scale.

5. The method of claim 1, wherein receiving the implementation grade further comprises receiving, via the computing device, a categorized implementation grade for the plurality of lowest detail level QFD requirements, wherein the categorized implementation grade is based on a perceived effectiveness of a corresponding lowest detail level QFD requirement.

6. The method of claim 5, further comprising converting, via a computing device processor, the categorized implementation grade to a numeric implementation grade prior to determine the implementation score for the plurality second level QFD requirements.

7. The method of claim 1, wherein determining the implementation score further comprises determining, via the computing device processor, a Critical-To-Quality (CTQ) implementation score for one or more CTQ attributes based on the implementation grades of lowest detail level QFD requirements that are associated with corresponding one or more CTQ attributes.

8. The method of claim 1, further comprising weighting, via a computing device processor, the implementation grades of each lowest detail level QFD requirement prior to averaging the implementation grades, wherein weighting accounts for an importance factor.

9. The method of claim 1, wherein determining the implementation score further comprises averaging, via the computing device processor, the implementation score of first-higher detail level QFD requirements associated with a second-higher detail level QFD requirement to determine the implementation score of the second-higher detail level QFD requirement.

10. A device for assessing the effective delivery of Quality Function Deployment (QFD) design planning, comprising:
    a computing platform having at least one processor and a memory in communication with the processor; and
    a QFD implementation scoring module stored in the memory, and executable by the processor after implementing all design and functional requirements of an associated product or service design, wherein the module includes,
        QFD implementation scoring logic operable for (1) receiving an implementation grade for a plurality of lowest detail level QFD requirements and (2) determining an implementation score for each of a plurality of second level QFD requirements by averaging the implementation grades of each lowest detail level QFD that is associated with a corresponding second level QFD requirement, (3) comparing the implementation scores to predefined implementation score thresholds, and (4) categorizing implementation success for each of the second level QFD requirements as one of low success, medium success or high success based on the comparison, wherein the implementation grade is an indicator of how effective a corresponding lowest detail level QFD requirement has been implemented, the second level is a next level above the lowest detail level and the implementation score is an indicator of how effective a corresponding second level QFD requirement has been implemented.

11. The device of claim 10, wherein the QFD implementation scoring logic is further operable to determine the implementation score for each of the QFD requirements above the lowest detail level.

12. The device of claim 11, wherein the QFD requirements above the lowest-level include at least one of QFD design requirements, QFD functional requirements or Critical-To-Quality (CTQ) attributes.

13. The device of claim 10, wherein the QFD implementation scoring module is further operable to access relationship matrix data associated with QFD design planning to determine associations between the lowest detail level QFD requirements and the second level QFD requirements.

14. The device of claim 10, wherein the QFD implementation scoring logic is further operable to receive a numeric implementation grade for the plurality of lowest detail level QFD requirements, wherein the numeric implementation grade is based on a predetermined numeric grading scale.

15. The device of claim 10, wherein the QFD implementation scoring logic is further operable to receive a categorized implementation grade for the plurality of lowest detail level QFD requirements, wherein the categorized implementation grade is based on a perceived effectiveness of the lowest detail level QFD requirement.

16. The device of claim 15, wherein the QFD implementation scoring logic is further operable to convert the categorized implementation grade to a numeric implementation grade prior to determine the implementation score for each of the plurality of second level QFD requirements.

17. The device of claim 10, wherein the QFD implementation scoring logic is further operable to determine a Critical-To-Quality (CTQ) implementation score for one or more CTQ attributes based on the implementation grades of lowest detail level QFD requirements and an association between the lowest detail level QFD requirements and the one or more CTQ attributes.

18. The device of claim 10, wherein the QFD implementation scoring logic is further operable to weight the implementation grades of each lowest detail level QFD requirement prior to averaging the implementation grades, wherein weighting accounts for an importance factor.

19. The device of claim 10, wherein the QFD implementation scoring logic is further operable to average the implementation grade of lowest detail level QFD requirements associated with a first-higher detail level QFD requirement to determine the implementation score of the first-higher detail level QFD requirement.

20. The device of claim 19, wherein the QFD implementation scoring logic is further operable to average the implementation score of first-higher detail level QFD requirement associated with a second-higher detail level QFD requirement to determine the implementation score of the second-higher detail level QFD requirement.

21. A computer program product, comprising:
a non-transitory computer-readable medium comprising:
a first set of codes for causing a computer to associate a plurality of lowest detail level QFD requirements with one or more of a plurality of second level QFD requirements, wherein the QFD requirements are defined for a design of a product or service and the second level is a next level above the lowest detail level;

a second set of codes for causing the computer to receive an implementation grade for the plurality of lowest detail level QFD requirements, wherein the implementation grade is an indicator of how effective a corresponding lowest detail level QFD requirement has been implemented;

a third set of codes for causing the computer to determine an implementation score for each of the plurality of second level QFD requirements by averaging the implementation grades of each lowest detail level QFD requirement that is associated with a corresponding second level QFD requirement to determine the implementation score of the corresponding second level QFD requirement, wherein the implementation score is an indicator of how effective the corresponding second level QFD requirement has been implemented;

a fourth set of codes for causing the computer to compare the implementation scores to predefined implementation score thresholds; and a fifth set of codes for causing the computer to categorize implementation success for each of the second level QFD requirements as one of low success, medium success or high success based on the comparison of the implementation scores to the predefined implementation score thresholds, wherein prior to releasing the product or service to customers, remedial actions are executed on the second level QFD requirements categorized as low success.

22. The computer program product of claim 21, wherein the third set of codes further comprising codes for causing the computer to determine the implementation score for one or more QFD requirements above the lowest detail level based on the implementation grades of the lowest detail level QFD requirements that are associated with the one or more QFD requirements above the lowest detail level.

23. The computer program product of claim 22, wherein the third set of codes further comprises codes for causing the computer to determine the implementation score for each of the QFD requirements above the lowest detail level.

24. The computer program product of claim 23, wherein the third set of codes further comprises codes for causing the computer to determine the implementation score for each of the QFD requirements above the lowest detail level further defines each of the QFD requirements above the lowest detail level as including at least one of QFD design requirements, QFD functional requirements or Critical-To-Quality (CTQ) attributes.

25. The computer program product of claim 21, wherein the first set of codes further comprises codes for causing the computer to associate the plurality of lowest detail level QFD requirements with the one or more of the plurality of second level QFD requirements based on QFD relationship matrix scoring values.

26. The computer program product of claim 21, wherein the second set of codes further comprises codes for causing the computer to receive a numeric implementation grade for the plurality of lowest detail level QFD requirements, wherein the numeric implementation grade is based on a predetermined numeric grading scale.

27. The computer program product of claim 21, wherein the second set of codes further comprises codes for causing the computer to receive a categorized implementation grade for the plurality of lowest detail level QFD requirements, wherein the categorized implementation grade is based on a perceived effectiveness of the first lowest detail level QFD requirement.

28. The computer program product of claim 27, wherein the second set of codes further comprises codes for causing the computer to convert the categorized implementation grade to a numeric implementation score prior to determine the implementation score for the plurality of second level QFD requirements.

29. The computer program product of claim 21, wherein the third set of codes further comprises codes for causing the computer to determine a Critical-To-Quality (CTQ) implementation score for one or more CTQ attributes based on the implementation grades of the lowest detail level QFD requirements that are associated with the one or more CTQ attributes.

30. The computer program product of claim 22, wherein the third set of codes further comprises codes for causing the computer to average the implementation of the lowest detail level QFD requirements that are associated with a first-higher detail level QFD requirement to determine the implementation score of the first-higher detail level QFD requirement.

31. The computer program product of claim 30, wherein the third set of codes further comprises codes for causing the computer to average the implementation scores of first-higher detail level QFD requirements that are associated with a second-higher detail level QFD requirement to determine the implementation score of the second-higher detail level QFD requirement.

* * * * *